(12) United States Patent
Shimezawa et al.

(10) Patent No.: US 12,101,761 B2
(45) Date of Patent: Sep. 24, 2024

(54) COMMUNICATIONS DEVICES, METHODS OF OPERATING COMMUNICATIONS DEVICES, INFRASTRUCTURE EQUIPMENT AND METHODS

(71) Applicant: Sony Group Corporation, Tokyo (JP)

(72) Inventors: Kazuyuki Shimezawa, Basingstoke (GB); Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 453 days.

(21) Appl. No.: 17/419,720

(22) PCT Filed: Dec. 3, 2019

(86) PCT No.: PCT/EP2019/083504
§ 371 (c)(1),
(2) Date: Jun. 30, 2021

(87) PCT Pub. No.: WO2020/143960
PCT Pub. Date: Jul. 16, 2020

(65) Prior Publication Data
US 2022/0086872 A1 Mar. 17, 2022

Related U.S. Application Data

(60) Provisional application No. 62/790,770, filed on Jan. 10, 2019.

(30) Foreign Application Priority Data

Jan. 10, 2019 (EP) .................................. 19151297

(51) Int. Cl.
H04W 72/1268 (2023.01)
H04L 5/00 (2006.01)
(Continued)

(52) U.S. Cl.
CPC ....... *H04W 72/1268* (2013.01); *H04L 5/0039* (2013.01); *H04L 5/1469* (2013.01); *H04W 72/0446* (2013.01); *H04L 5/0007* (2013.01)

(58) Field of Classification Search
CPC .......... H04W 72/1268; H04W 72/0446; H04L 5/0039; H04L 5/1469; H04L 5/0007;
(Continued)

(56) References Cited

U.S. PATENT DOCUMENTS 7,308,005 B1 * 12/2007 Roggendorf .......... H04W 28/06
370/347
2015/0031410 A1 1/2015 Lim
(Continued)

FOREIGN PATENT DOCUMENTS

CN 104684096 A 6/2015
CN 104685845 A 6/2015
(Continued)

OTHER PUBLICATIONS

NTT DOCOMO, "Physical Layer Enhancements for NR URLLC", 3GPP TSG RAN WG1 Meeting #94, R1-1809163, Aug. 20-24, 2018, pp. 1-15. (Year: 2018).*
(Continued)

*Primary Examiner* — Thinh D Tran
(74) *Attorney, Agent, or Firm* — XSENSUS LLP

(57) ABSTRACT

A method of operating a communications device to transmit data to a wireless communications network comprises preparing to transmit uplink data as one or more transport blocks using a selected set of communications resources. The method includes detecting that the set of communications resources selected for transmitting the uplink data on the uplink resources will cause transmission of a transport block across a boundary between two of the time divided units or slots, and adapting the transmission of the detected
(Continued)

transport block to avoid the boundary between the two time slots.

19 Claims, 16 Drawing Sheets

(51) Int. Cl.
*H04L 5/14* (2006.01)
*H04W 72/0446* (2023.01)

(58) Field of Classification Search
CPC ..... H04L 5/0044; H04L 5/0053; H04L 27/26; H04L 5/0051
See application file for complete search history.

(56) References Cited

U.S. PATENT DOCUMENTS

| | | | |
|---|---|---|---|
| 2017/0111889 A1 | 4/2017 | Li | |
| 2017/0289108 A1 | 10/2017 | Lee | |
| 2017/0367110 A1 | 12/2017 | Li | |
| 2018/0254860 A1 | 9/2018 | Wong | |
| 2020/0052828 A1* | 2/2020 | Wang | H04L 1/188 |
| 2020/0195386 A1* | 6/2020 | Marinier | H04L 1/1854 |

FOREIGN PATENT DOCUMENTS

| | | |
|---|---|---|
| CN | 105637793 A | 6/2016 |
| CN | 107203413 A | 9/2017 |
| CN | 109075933 A | 12/2018 |
| EP | 2907278 | 8/2015 |
| EP | 18197372.8 A1 | 4/2020 |
| JP | 2019517267 A | 6/2019 |
| WO | WO-2014153688 A1 | 10/2014 |
| WO | WO-2018025493 A1 | 2/2018 |
| WO | WO-2018143879 A1 | 8/2018 |
| WO | 2020/064438 A1 | 4/2020 |

OTHER PUBLICATIONS

NTT DOCOMO, "DL/UL Resource Allocation", 3GPP TSG RAN WG1 Meeting 91, R1-1720821, Nov. 27-Dec. 1, 2017, pp. 1-12. (Year: 2017).*
NTT DOCOMO, "Enhanced UL transmission with configured grant for URLLC", 3GPP TSG RAN WG1 Meeting #94, R1-1809165, Aug. 20-24, 2018 (Year: 2018).*
International Search Report and Written Opinion mailed on Feb. 14, 2020, received for PCT Application PCT/EP2019/083504, Filed on Dec. 3, 2019, 12 pages.
NTT DOCOMO, "DL/UL Resource Allocation", 3GPP TSG RAN WG1 Meeting 91, R1-1720821, Nov. 27-Dec. 1, 2017, pp. 1-12.
NTT DOCOMO, "Physical Layer Enhancements for NR URLLC", 3GPP TSG RAN WG1 Meeting #94, R1-1809163, Aug. 20-24, 2018, pp. 1-15.
Nokia et al., "On Configured Grant Enhancements for NR URLLC", 3GPP TSG RAN WG1 Meeting #95, R1-1813118, Nov. 12-16, 2018, 12 pages.
NTT DOCOMO, "sPUSCH for Shortened TTI", 3GPP TSG RAN WG1 Meeting #87, R1-1612697, Nov. 14-18, 2016, pp. 1-7.
Holma et al. "LTE for UMTS OFDMA and SC-FDMA Based Radio Access", John Wiley and Sons, 2009, pp. 25-27.
NTT DOCOMO, "Work Item on New Radio (NR) Access Technology,", 3GPP TSG RAN Meeting #78, RP-172834, Dec. 18-21, 2017, 11 pages.
Huawei et al., "New SID on Physical Layer Enhancements for NR URLLC,", 3GPP TSG-RAN#80, RP-181477, Jun. 11-14, 2018, 5 pages.
NTT DOCOMO, Inc., "Summary of 7.2.6.3 Enhanced UL Grant-Free Transmissions", 3GPP TSG RAN WG1 Meeting #94, R1-1809979, Aug. 20-24, 2018, 20 pages.
LG Electronics, "Discussion on enhancement for grant-free transmission"[online], 3GPP TSG RAN WG1 #95 R1-1812578, Nov. 3, 2018.

* cited by examiner

COMMUNICATIONS DEVICES, METHODS OF OPERATING COMMUNICATIONS DEVICES, INFRASTRUCTURE EQUIPMENT AND METHODS

CROSS-REFERENCE TO RELATED APPLICATIONS

The present application is based on PCT filing PCT/EP2019/083504, filed Dec. 3, 2019, which claims priority to EP 19151297.9, filed Jan. 10, 2019 and U.S. 62/790,770, filed Jan. 10, 2019, the entire contents of each are incorporated herein by reference.

BACKGROUND

Field of Disclosure

The present disclosure relates to communications devices, methods of operating communications devices, infrastructure equipment and methods for communicating uplink data using uplink resources in wireless communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to support efficient connectivity for a wide range of devices associated with different applications and different characteristic data traffic profiles to support different services.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed. For example grant free resources have been provided for transmitting uplink data as well as downlink data, which can reduce a latency of transmitting the uplink/downlink data. However some further adaptation may be required to make efficient use of communications resources when using grant fee resources.

SUMMARY OF THE DISCLOSURE

The present disclosure can help address or mitigate at least some of the issues discussed above.

Embodiments of the present technique can provide a method of operating a communications device to transmit data to a wireless communications network. The method comprises preparing to transmit uplink data as one or more transport blocks using a selected set of communications resources for transmitting the uplink data. The selected set of communications resources can provide communications resources in each of a plurality of time divided units or slots of the wireless access interface. The set of the communications resources may be selected for example from resources granted by the wireless communications network or selected from grant free communications resources. Grant free communications resources in contrast to granted communications resources are resources which can be used by a communications device without a specific request and grant from the wireless communications network. The set of the communications resources may be arranged so that as far as possible these are contiguous, in that the resources are selected for transmitting the transport blocks of the uplink data as quickly as possible. The method further includes detecting that the set of communications resources selected for transmitting the uplink data on the uplink resources will cause transmission of a transport block of the uplink data across a boundary between two of the time divided units or slots, and adapting the transmission of the detected transport block to avoid the boundary between the two time slots. The adapting can be for example delaying the transmission of the detected transport block or part of the transport block which would have crossed the boundary. The transmission of a transport block or part thereof (encoded data unit) avoids crossing the boundary between time divided units or slots so that other communications protocols and parameters required for the uplink data which are aligned on a slot basis are not disrupted, which otherwise might prevent the uplink data from being received correctly.

Example embodiments can also include identifying that as a result of the delaying the transmission of the detected transport block which would have crossed the boundary to the later of the two time divided units one or more of the set of communications resources selected for transmitting the uplink data in a first of the two time divided units will be unused or orphaned. The method can also include allocating the identified unused communications resources for transmitting other signals, and transmitting the other signals on the identified unused communications resources of the set of communications resources selected for transmitting the uplink data. The other signals can be for example uplink control information usually transmitted in an uplink control channel or an uplink shared channel depending on the protocol. The unused resource can also be used to transmit the detected transport block by adapting a coding of the transport block to use the extra resource provided by the identified unused resource.

Embodiments of the present technique, which further relate to infrastructure equipment, communications devices as well as methods of operating communications devices, and infrastructure equipment, methods and circuitry for communications devices and infrastructure equipment, can provide an improvement in the transmission of uplink data using grant free communications resources.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 4*a* is an example representation of a downlink frame structure for supporting an enhanced mobile broadband (eMBB) communications service, whereas FIG. 4*b* is an example representation of a downlink frame structure for supporting an ultra-reliable and low latency communications (URLLC) service with which embodiments of the present technique find application;

DETAILED DESCRIPTION OF THE EMBODIMENTS

Long Term Evolution Advanced Radio Access Technology (4G)

Figure 1:
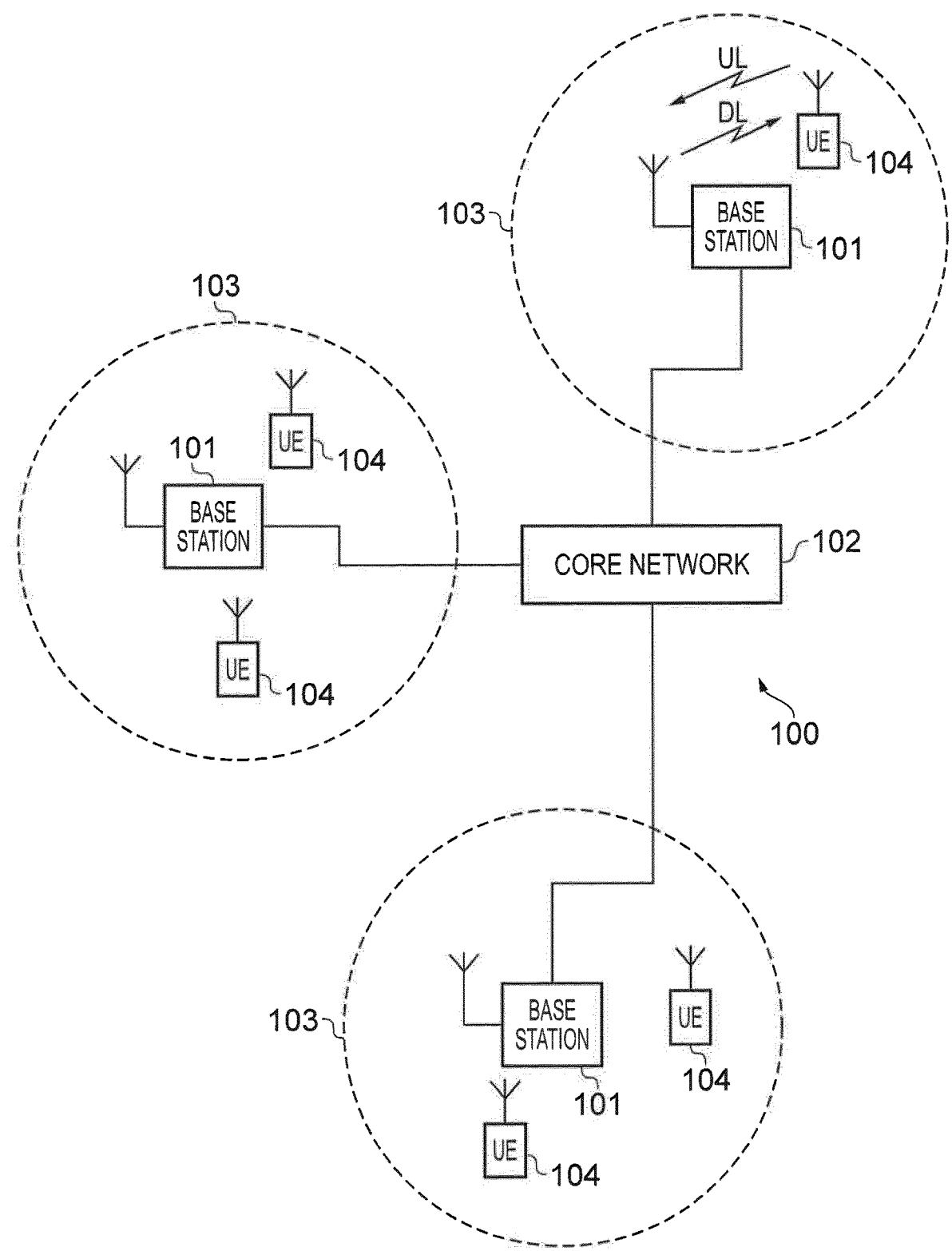
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP™ body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
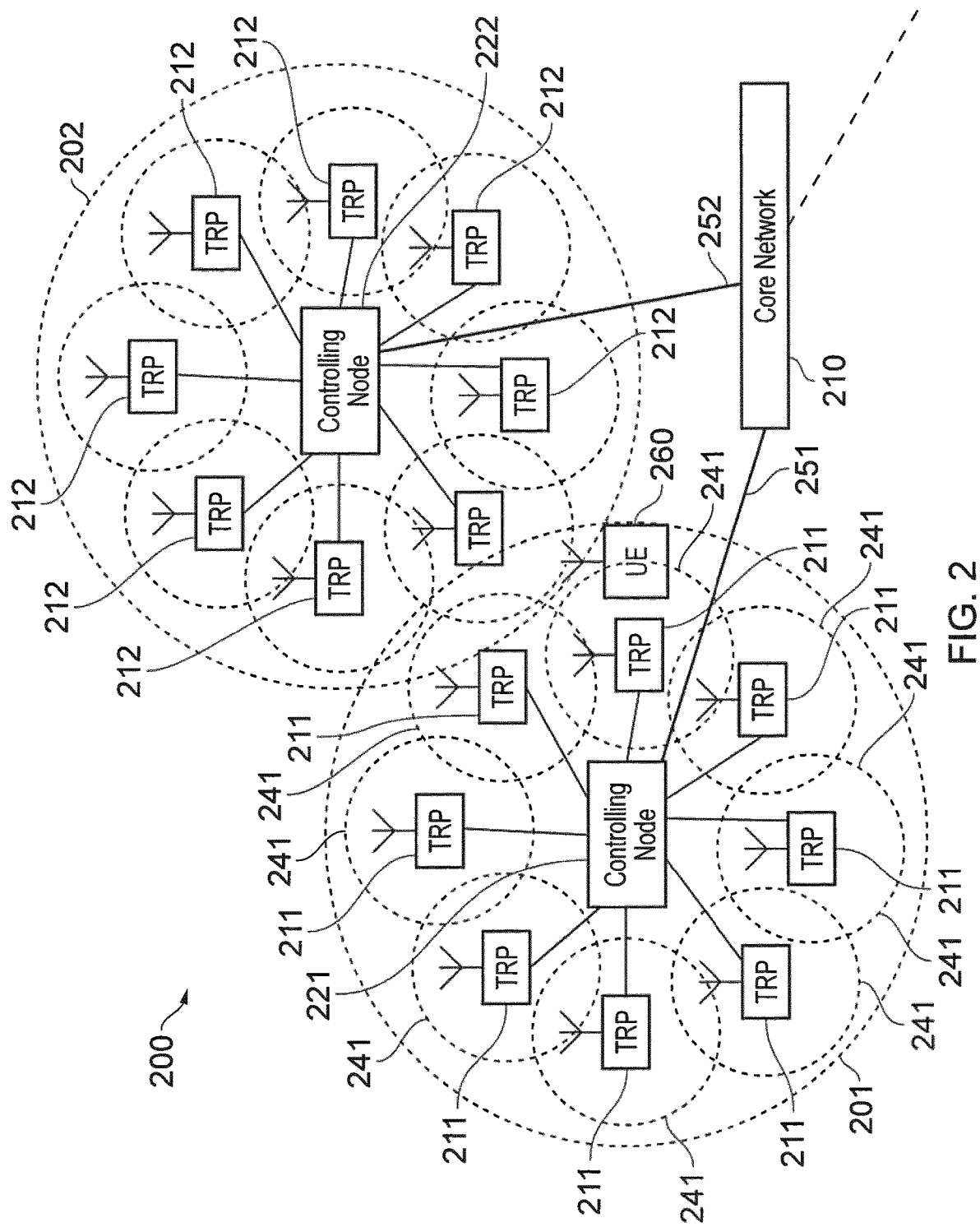
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 400 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
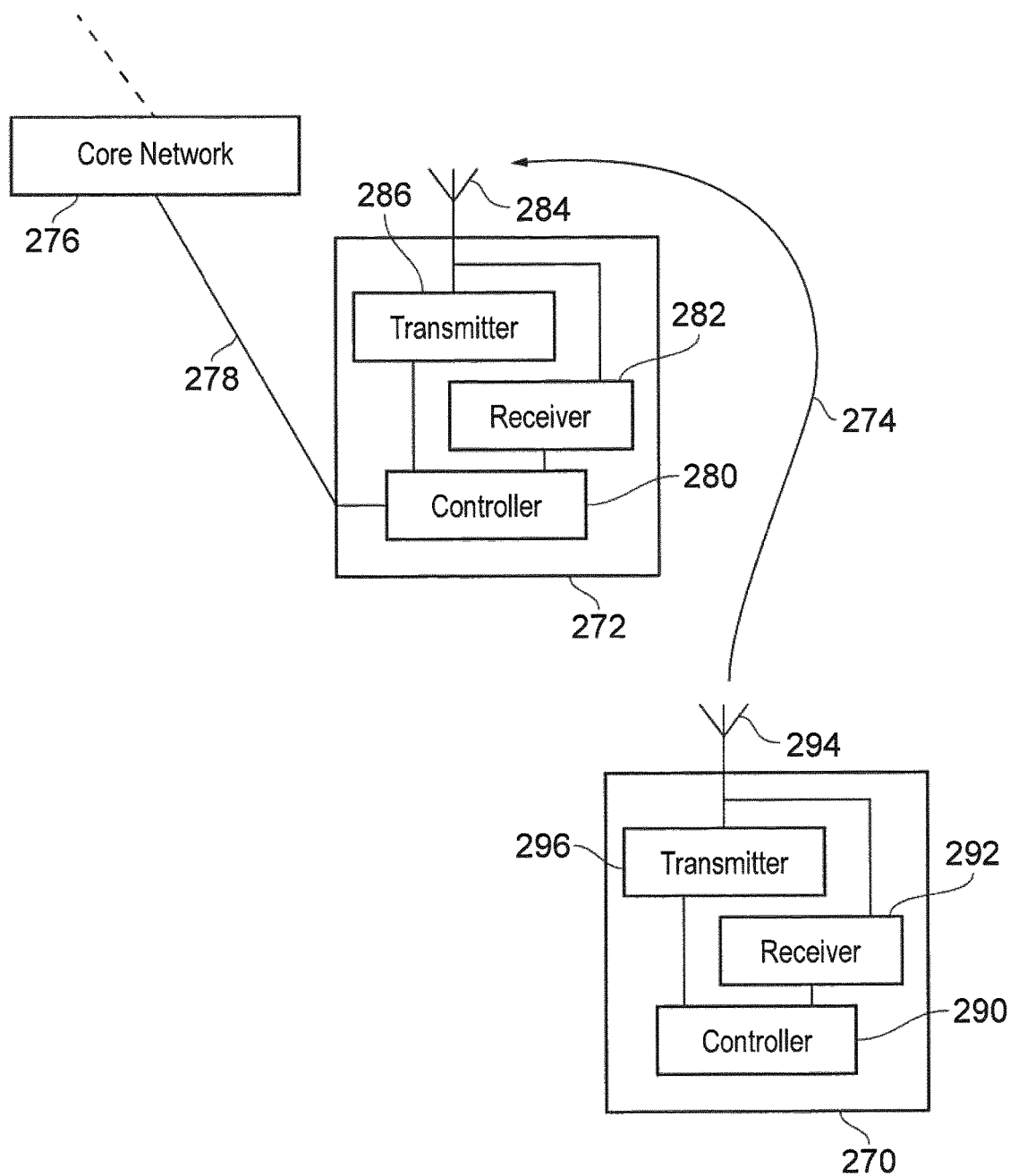
FIG. 3 is a schematic block diagram of an example infrastructure equipment and communications device configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

Figure 4:
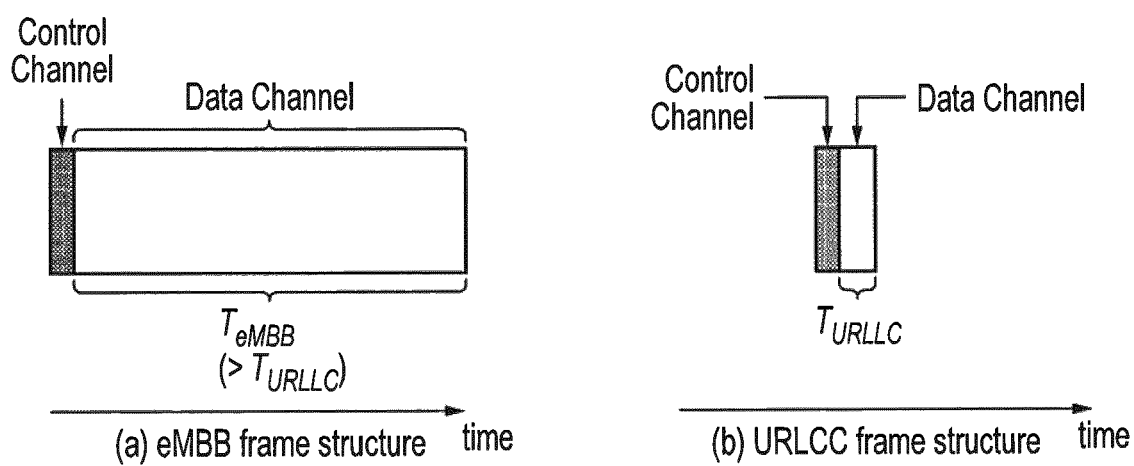

Example embodiments described below can find application with advanced wireless communications systems such as those referred to as 5G or New Radio (NR) Access Technology. 3GPP has recently completed a release of the New Radio (NR) Access Technology Work Item [2], where the $5^{th}$ generation or 5G radio access network is specified. Two of the NR functionalities specified in this Work Item are:

Enhanced Mobile Broadband (eMBB)
Ultra Reliable & Low Latency Communications (URLLC)

eMBB services are characterised by high capacity with a requirement to support up to 20 Gb/s. For efficient transmission of large amounts of data at high throughput, eMBB is likely to use slot aggregations (i.e. occupying one or more slots) to minimise the overhead used. An example eMBB frame structure in the downlink is shown in FIG. 4a with transmission period $T_{eMBB}$, where the control channel uses smaller transmission resources than that of the data channel.

An important requirement for URLLC is low latency measured from the ingress of a layer 2 packet to its egress from the network, with a proposed target of 1 ms. The URLLC data is expected to be short and hence a short scheduling time where the control and data have short duration are required within a frame duration that is significantly less than that of the eMBB frame. An example of a URLLC frame structure is shown in FIG. 4b with a transmission period of $T_{URLLC}$ (e.g. 0.25 ms), where the control and data channels occupy a short duration of time. The transmission period of URLLC $T_{URLLC}$ is smaller than that of eMBB $T_{eMBB}$, i.e. $T_{emBB} > T_{URLLC}$.

Another requirement of the URLLC is high reliability. In 3GPP Release-15, the URLLC packet needs to be received with a 99.999% reliability with 1 ms latency. As Release 16, a new study item on Physical Layer Enhancements for NR URLLC was approved in RAN plenary #80 in June 2018 [3]. In Release-16, this reliability requirement is increased to 99.9999%. A UL grant free (called as configured grant in 3GPP spec.) transmission is one of key techniques for URLLC in UL, and has been specified for mainly purpose of low latency transmission in Release-15.

Figure 16:
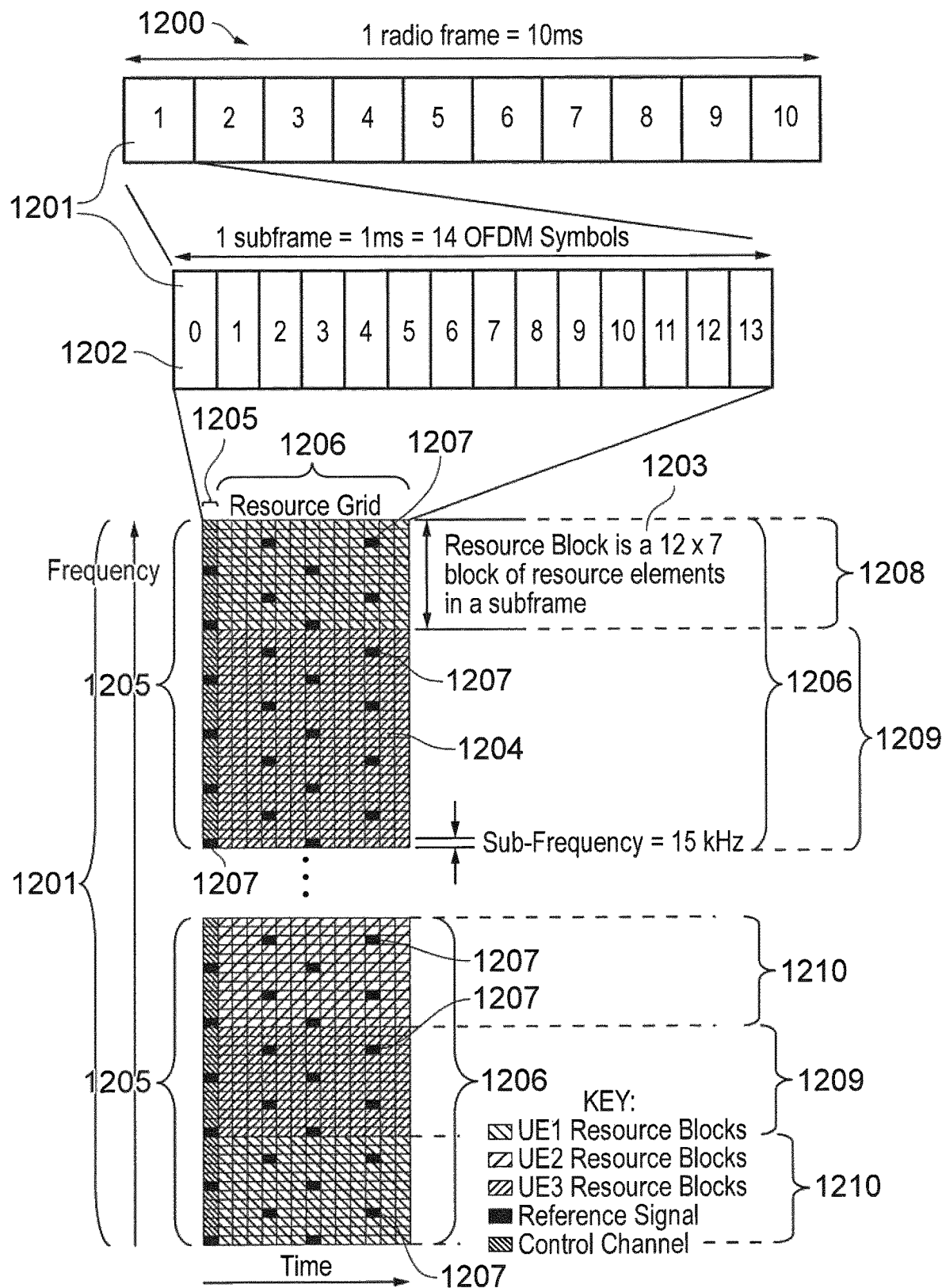
FIG. 16 is a schematic representation of a downlink of a wireless access interface according to the 3GPP LTE standard.
Figure 17:
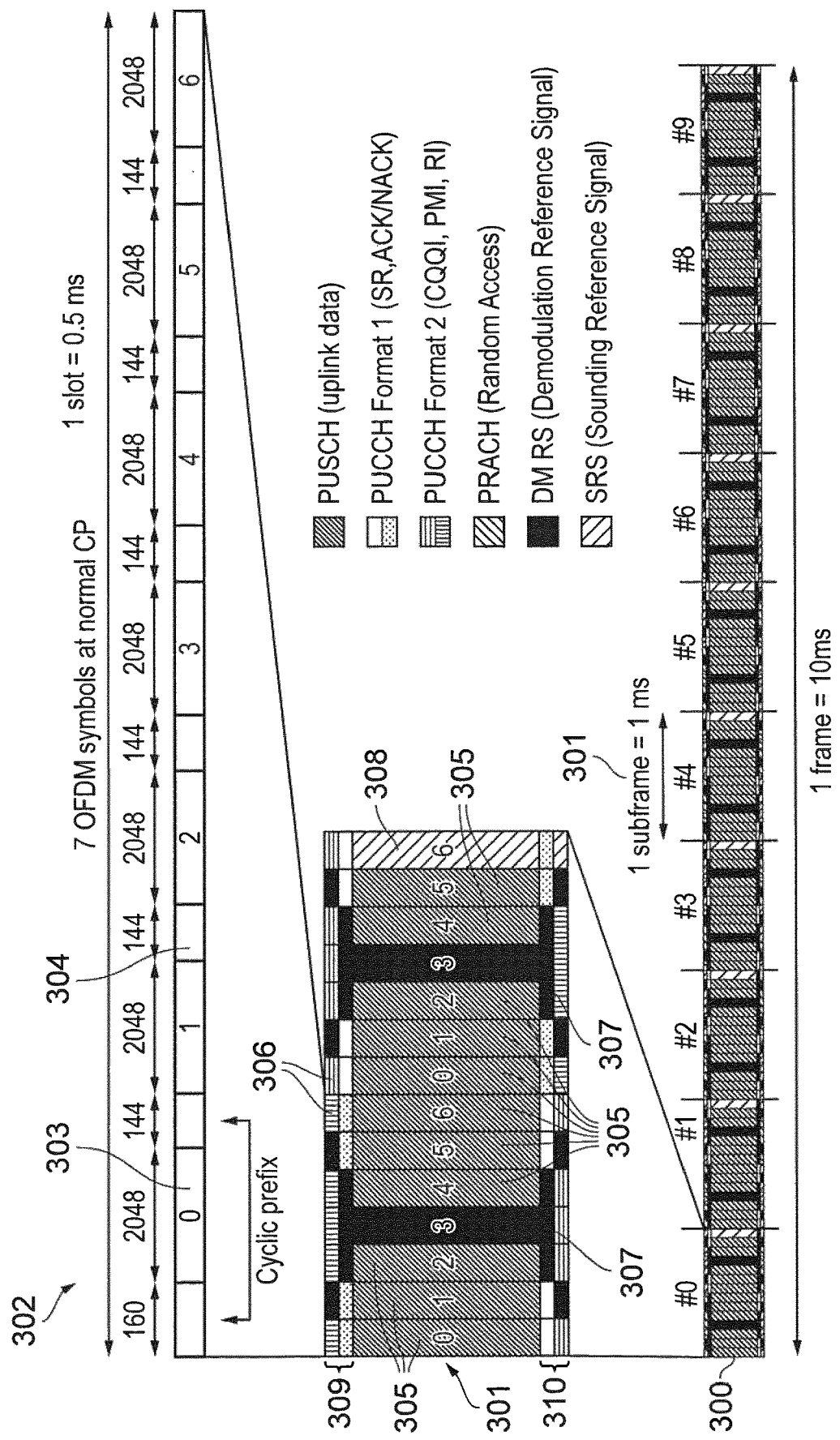
FIG. 17 is a schematic representation of an uplink of a wireless access interface according to the 3GPP LTE standard.

Embodiments of the present technique described below provide a more efficient arrangement for utilising communications resources caused by a requirement to transmit uplink data as soon as possible via an uplink resource of the wireless access interface. A better appreciation provided by the example embodiments can be gained from reviewing a proposed wireless access interface according to 3GPP LTE/4G and NR/5G. A wireless access interface in accordance with a 3GPP Standard for LTE is described in detail in Annex 1 in which FIGS. 16 and 17 provide detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink.

Figure 5:
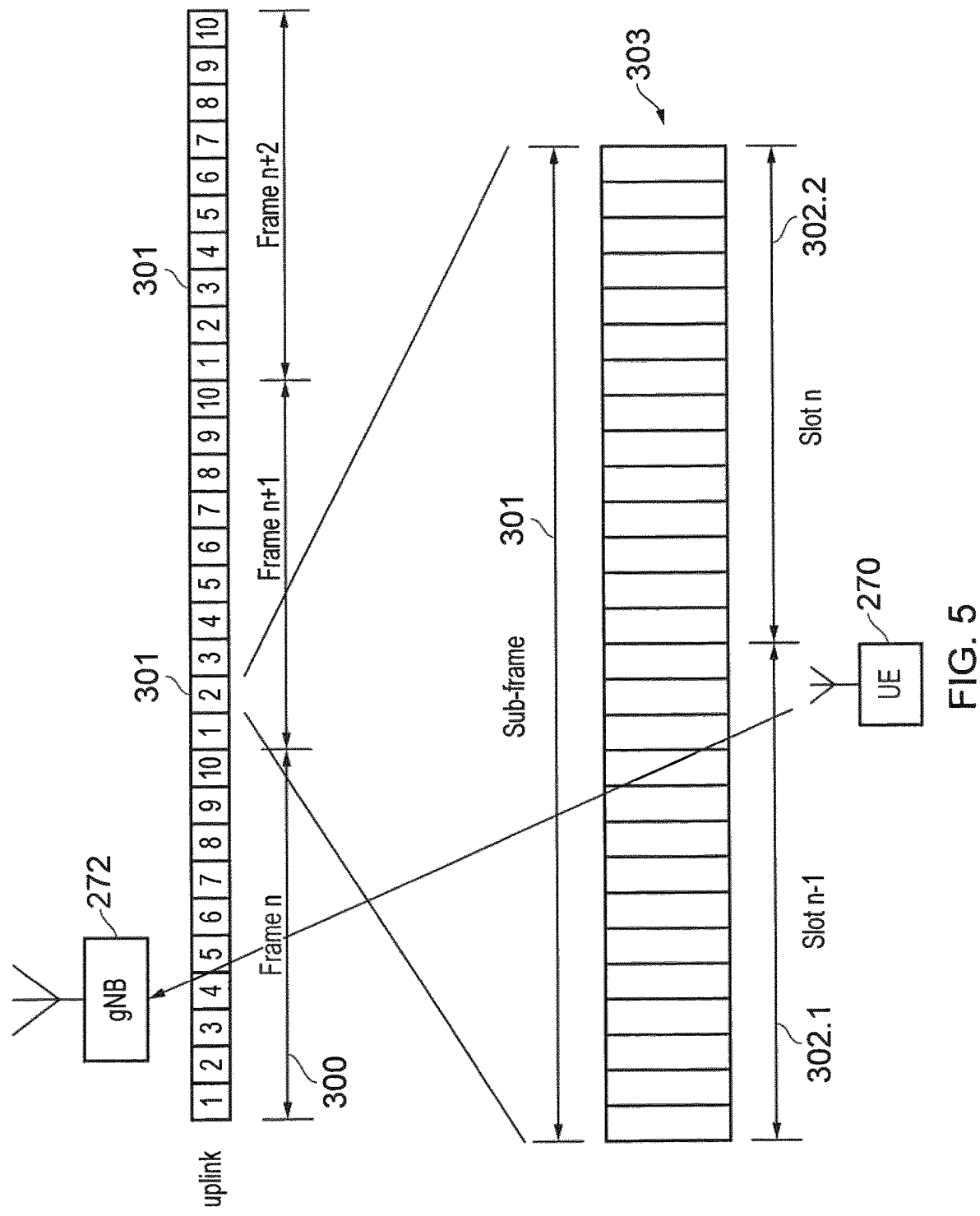
FIG. 5 is a schematic illustration of a simplified representation of an uplink of the wireless access interface shown in FIG. 15 illustrating a frame, sub-frame and slot structure of time divided units of the wireless access interface.

FIG. 5 provides a simplified representation of an uplink structure with time divided units which may be used for the NR wireless access interface structure. Whilst the terms "frames" and "sub-frames" used in FIG. 5 are terms which have been used in LTE, 3GPP standards adopted for 5G/NR may be different and so it will be appreciated that FIG. 5 is provided for illustration only to assist in the explanation of the example embodiments. Current proposals for a time divided structure for 5G/NR include that one slot providing a time divided structure of the wireless access interface consists of 14 OFDM symbols, and one sub-frame is defined by 1 ms. As such, the time divided structure of the wireless access interface of FIG. 5 shows an example in case of 30 kHz carrier spacing, so that one sub-frame has two slots and twenty eight symbols. As shown in FIG. 5, the uplink of the wireless access interface is shown to comprise frames 300 with respect to which the UE 270 transmits uplink data to the infrastructure equipment 272. Consistent with the explanation provided in Annex 1, the uplink comprises in each frame 300 ten sub-frames 301. A frame 300 is defined by 10 ms, a sub-frame 301 is defined by 1 ms, and a slot 302 is defined by fourteen OFDM symbols, irrespective of subcarrier spacing. In FIG. 5, 30 kHz subcarrier spacing is assumed. An expanded view of the components of a sub-frame 310 are shown to be formed from two consecutive slots n-1, n 302, include physical resources of a shared channel as well as control channels as explained in Annex 1 with reference to FIG. 15. As explained in the following section, although access by UEs to the shared resources of the uplink channel by request and grant from the infrastructure equipment, embodiments of the present technique find application with grant free access to the resources of the uplink shared channel (PUSCH). As such transmission of a URLLC message by a UE 270 can be done more quickly incurring a shorter delay.

Improvements in or Relating to Uplink Communication Using Grant Free Resources

One aspect of a NR or 5G wireless access interface as controlled for example by the controller 272 of the infrastructure equipment 272 is the provision of grant free access to communications resources for transmitting uplink data. In a conventional uplink transmission, when data arrives from upper protocol layers at a buffer at the medium access control (MAC) protocol layer of the communications device, the communications device may transmit, in response, a Scheduling Request (SR) to the network. The SR may comprise a buffer status report (BSR), indicating an amount of data in the MAC layer buffer(s). In response to receiving the SR, the network (for example, the infrastructure equipment) may send an Uplink Grant carried by downlink control information (DCI) to the communications device. The DCI may be transmitted on a physical downlink control channel (PDCCH).

The uplink grant may comprise an indication of uplink communications resources which are allocated (or, in other words, scheduled) for the communications device to transmit its uplink data. The uplink communications resources may be on a physical uplink shared channel (PUSCH). This type of resource allocation is known as grant based resource allocation. Grant based resource allocation is suitable for services where the data arrives in variable amounts, and/or is aperiodic, even if such the data traffic arrival follows a somewhat predictable traffic pattern.

On the other hand, grant free resources are a set of periodically repeating uplink communications resources which are semi-statically configured by the network for the use of the communications device for uplink transmission. Grant free resources allocation is particularly suitable for services that generate periodic data traffic, where the amount generated is broadly constant over time.

Figure 6:
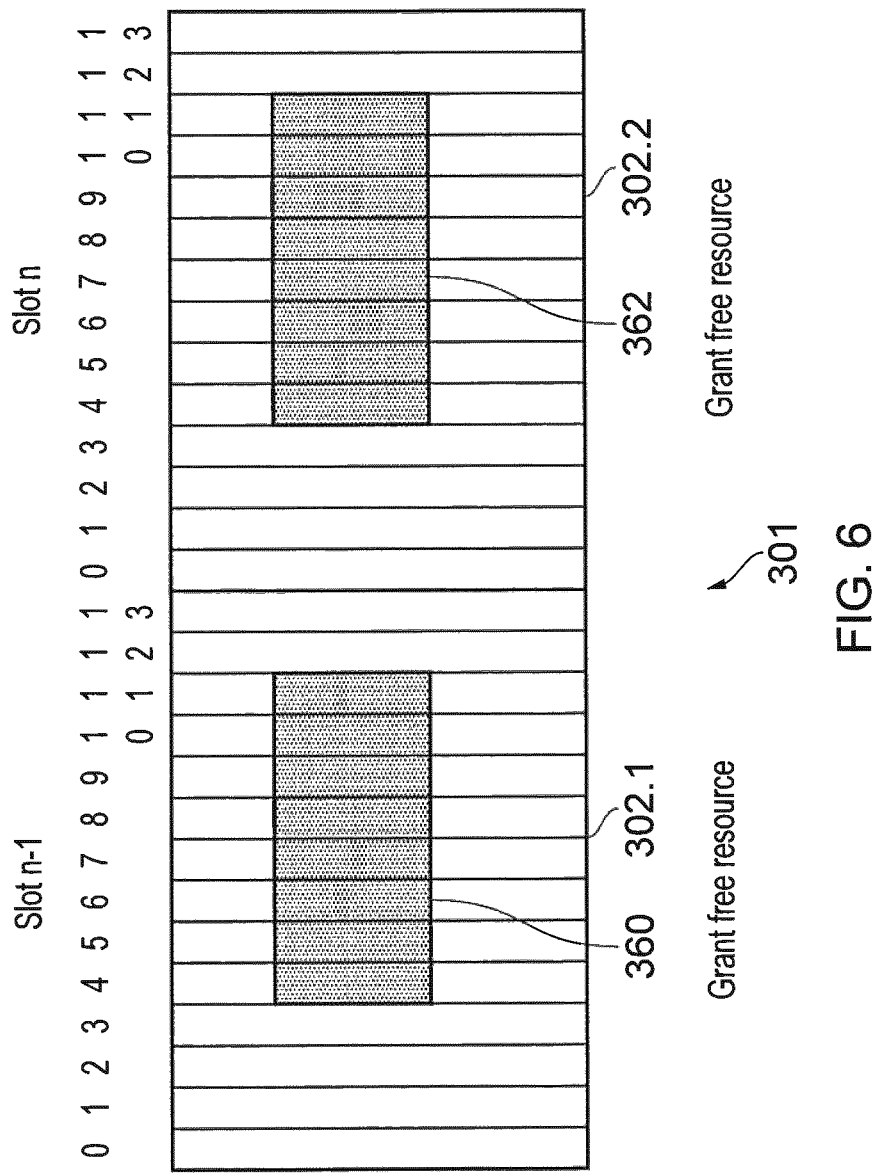
FIG. 6 is an illustration of the uplink of the wireless access interface shown in FIG. 4 adapted to include communications resources configured for grant free access by communications devices.

The grant free resources can improve the efficiency with which communications resources are used, since there is no need for both a SR and uplink grant to be transmitted in respect of each uplink data transmission. An illustration of grant free resources for communicating uplink data is shown in FIG. 6 based on the frame/sub-frame/slot structure illustrated in FIG. 5. As shown in FIG. 6, the two slots n-1, n 302.1, 302.2, which each comprise fourteen OFDM symbols 303 are shown to include a section of grant free resources in each slot 360, 362 from OFDM symbol numbered 4 to 11.

An explanation of a technical problem addressed by the example embodiments can be appreciated by considering a timing structure of an uplink of a wireless access interface proposed for NR. As illustrated in FIG. 6, the grant free resources are provided in the uplink in a temporal section of each slot. However if the generation and encoding of transport blocks into data units does not match a timing of the grant free resources then a coding or transmission scheme may be compromised or the resources used inefficiently. A better understanding of a timing of an encoding of transport blocks into encoded data units for transmission may be appreciated from a more detailed example of the transmitter 296 and the receiver 292 of the UE 270 which is provided in FIGS. 7 and 8.

Figure 7:
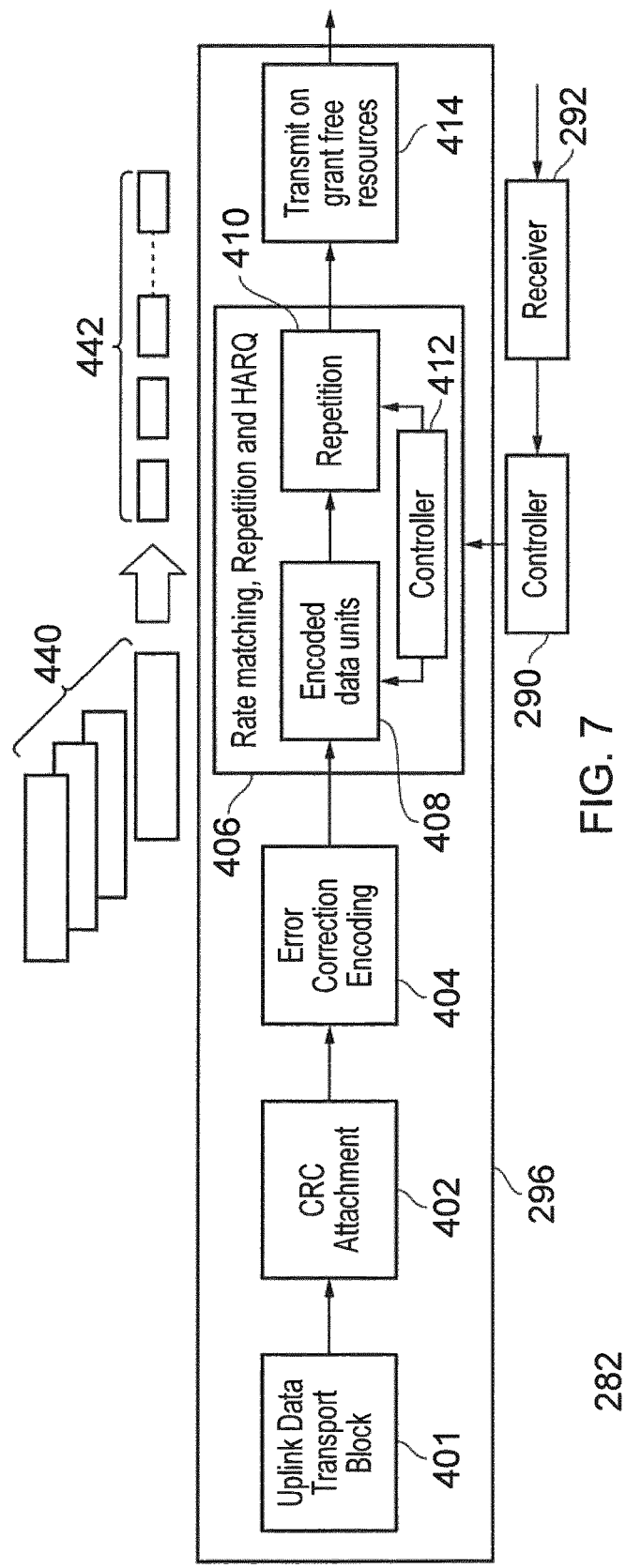
FIG. 7 is a schematic block diagram of an example transmitter (also showing a receiver and a controller of a communications device) configured to transmit uplink data using uplink grant free resources illustrated in FIG. 6.

As shown in FIG. 7, uplink data for transmission is formed into transport blocks by for example a medium access control layer and passed to a physical layer for transmission by an uplink data transport block 401. The uplink transport blocks are then fed to a CRC Attachment block 402, which calculates a cyclic redundancy check (CRC) on each transport data block before passing the combined CRC parity check bits and data bits representing to an error correction encoder 404. The error correction encoder encodes the CRC and the data bits of the transport blocks to form error correction encoded transport blocks 440 for transmission on the grant free resources 360, 363. The error correction encoded transport blocks are then received by a rate matching, repetition and hybrid automatic repeat request (HARQ) block 406 which includes an encoded data unit former 408 and a repetition block 410. The rate matching, repetition and HARQ block 406 is controlled by a controller 412 to generate encoded data units 442 for transmission by a transmission block 414 on the uplink grant free resources.

Figure 8:
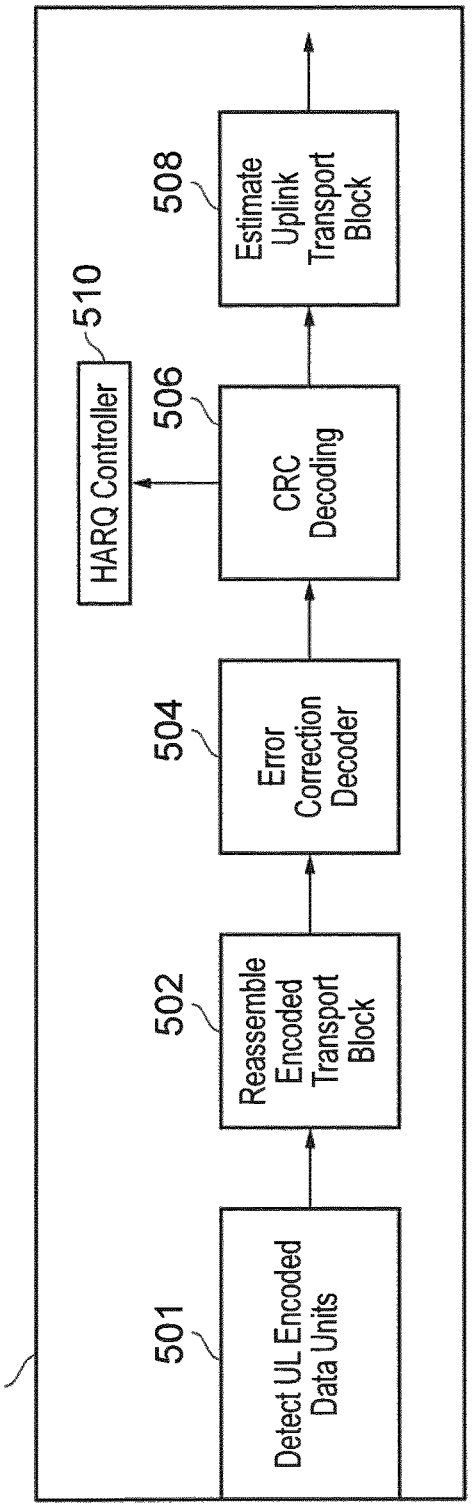
FIG. 8 is a schematic block diagram of an example receiver configured to receive uplink data transmitted via the uplink grant free resources illustrated in FIG. 6.

A schematic block diagram of the receiver 282 of the infrastructure equipment 272 for detecting radio signals transmitted from the UE 270 in the grant free resources and for decoding the encoded transport block represent by the radio signals is shown in FIG. 8. As shown in FIG. 8 a detection block 501 detects the encoded units of data transmitted uplink grant free resources 360, 363 from the UE 270. As explained below the encoded data units making up each encoded transport block may be transmitted using a HARQ scheme and a repetition scheme in which the same encoded data unit is transmitted repeatedly in the uplink grant free resources. Therefore after detecting the encoded data units, a reassemble encoded transport block element 502 reassembles the encoded transport blocks from the encoded data units and feeds the encoded transport blocks to an error correction decoder 504. The reassemble block 502 may combine the repeated receptions of the encoded data units by soft-combining to reassemble the transport blocks, where soft-combination can comprise addition of log-likelihood ratios (LLRs) for received soft bits of the repetitions. The error correction decoder 504 decodes the encoded transport block and generates an estimate of the data in accordance with the error correction encoding scheme being used at the transmitter. A CRC decoder 506 performs CRC in accordance with a conventional arrangement to detect whether the uplink data in the transport block has been correctly received which outputs to the uplink data to a processing block 508.

As indicated above, in one example, the encoded transport blocks 440 may be transmitted via the grant free uplink resources using a HARQ scheme combined with repeated transmission. As such the rate matching, repetition and HARQ block 406, may divide the encoded transport blocks 440 into encoded data units 442 for transmission via the grant free resources of the uplink. In order to match a capacity of the uplink grant free resources, the encoded data units may be rate matched by puncturing the bits, for example where each encoded data unit 442 is to be transmitted one or more of the OFDM symbols in the slot 360, 362. Furthermore each encoded data unit may be transmitted according to a HARQ process in which the HARQ process gives each encoded data unit 442 a HARQ identifier. Furthermore in order for a HARQ controller 510 in the receiver 282 to perform the HARQ process match to the transmitter the HARQ identifier may be matched to the slot or sub-frame number rather than a time of generating each data unit in the transmitter 296. Finally, the rate matching, repetition and HARQ block 406 may transmit each of the encoded data unit a repeated number of times in order to improve integrity of the communicated uplink data by improving a likelihood that the uplink data is received correctly. For example it has been proposed for 3GPP release-16 to perform repeated transmission based on a mini-slot structure.

Mini-Slot-Level Repetition Transmission

As will be appreciated from the above explanation with reference to FIGS. 7 and 8, uplink data is formed for transmission into transport blocks. In the examples shown in FIGS. 7 and 8 the transport blocks are transmitted as encoded data units, which are transmitted repeatedly in mini-slots of the uplink PUSCH. The length of the PUSCH can be 1 to 14 symbols long, where a short PUSCH transmission, e.g. 2 OFDM symbols in length, can be used for low latency transmission such as for URLLC. In 3GPP, a "mini-slot" is a non formal description of a time unit occupying two OFDM symbols. Since there are 14 OFDM symbols in a slot, a "mini-slot" is also non-formally, referred to as a "sub-slot." Although the URLLC PUSCH can occupy any number of OFDM symbols up to 14 OFDM symbols, a PUSCH transmission occupying a mini-slot is often used to represent (non-formally) a URLLC PUSCH transmission.

In 3GPP standards (Rel-15 NR), PUSCH slot aggregation is introduced where a PUSCH Transport Block (TB) is repeated over multiple slots (up to 8 slots) to improve the reliability of the transmission. Hence, one proposed method to improve the reliability of URLLC PUSCH is to perform repetitions at the mini-slot level (or symbols level).

Figure 9:
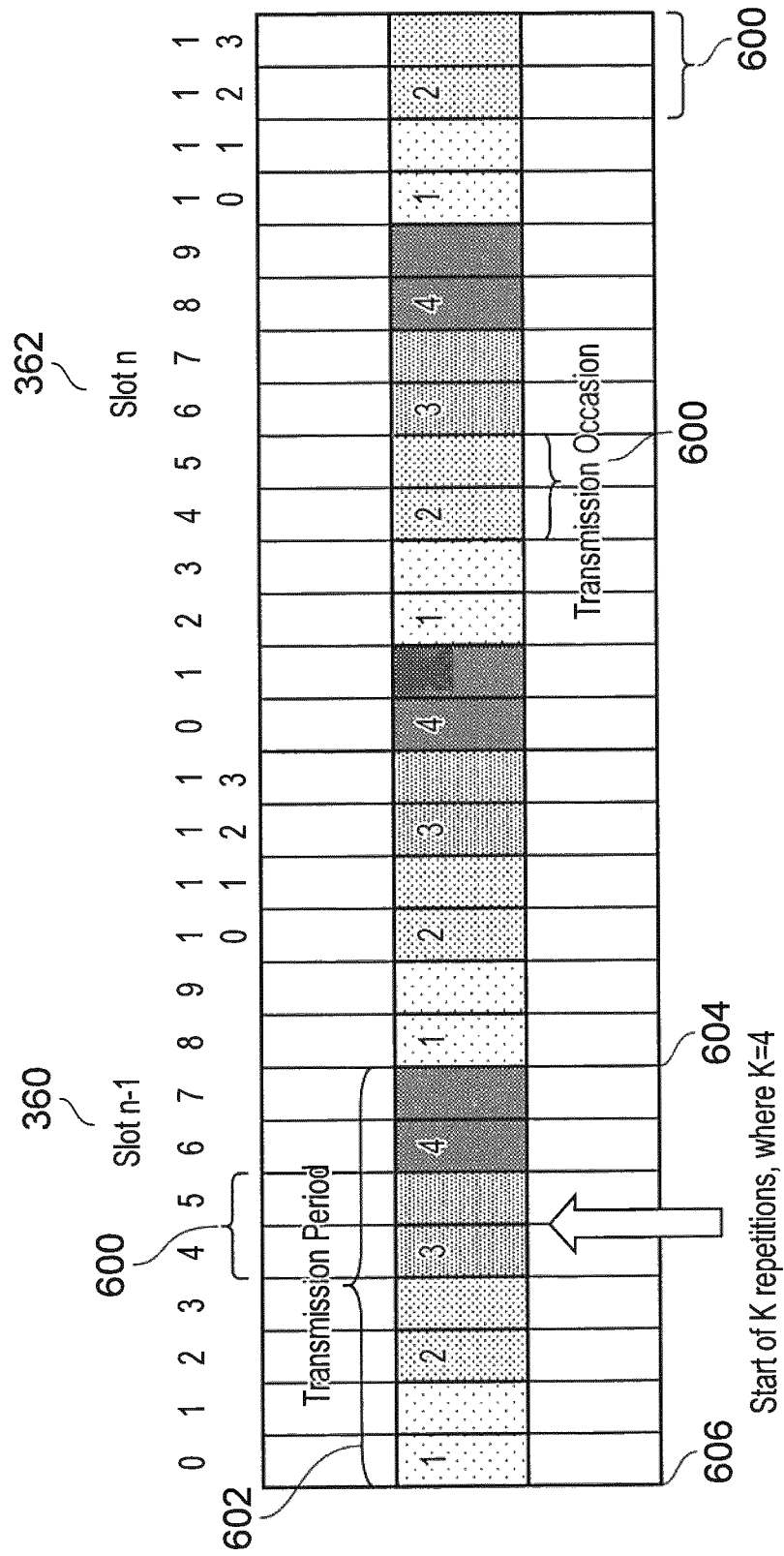
FIG. 9 is an illustration of the uplink of the wireless access interface shown in FIG. 6 adapted to include communications resources configured for grant free access by communications devices in which each of the time divided slots is divided into two mini-slots and encoded data units are transmitted repeatedly in a transmission period of the mini-slot.

As explained above, the uplink resources of the PUSCH which is used to transmit the transport blocks as encoded data units can be resources grant by the wireless access interface or grant free resources. According to one example encoded data units are transmitted repeatedly in the uplink resources. According to this example, each encoded unit 442 is transmitted in a mini-slot of the PUSCH, so that K repetitions of each of the encoded data units 442 are transmitted in a transmission period which may be for example a slot 360, 362, with each encoded data unit being transmitted in a transmission occasion. An example illustration is presented in FIG. 9 for an example in which K=4. These K repetitions are transmitted over four transmission occasions (TO) 600 where the number of K repetitions for of an encoded data unit transmitted in the TOs 600 form a transmission period 602 for transmitting each encoded data unit. The TO 600 implicitly indicates to the receiver 282 in the infrastructure equipment 272 a version of the encoded data unit, which can be referred to as a Redundancy Version whilst the transmission period implicitly indicates to the receiver 282 the HARQ process identifier.

If the transmission does not start at the beginning of a transmission period as interpreted at the receiver 282, the transmitter 296 of the UE 270 may not be able to transmit K repetitions since it may reach the end of the transmission period and hence a change in HARQ process identifier before the K repetitions have been transmitted. Essentially this is because a timing of the transmission of encoded data units is made with respect to the timing structure of the uplink so that the receiver may know the timing of the transmissions, but this may not match a timing of the generation of the uplink data for transmission. However, as a result of a requirement to transmit a URLLC transport block as soon as possible, the UE 270 may not wait for the start of the mini-slot, but begin to transmit the encoded data units as soon as possible. This technical problem applies equally to transmitted in uplink resources which are grant free or in resource grant on request from the wireless access network. That is, even with granted resources, the transmission of the uplink data may need to start as soon as possible which may not coincide with the uplink slot or mini-slot structure.

If the pre-defined K repetitions have to be ensured to provide a desired reliability and integrity of communication, transmission should be started from a first TO 606 of a transmission period 602. Therefore a starting opportunity of the repeated transmission of an encoded data unit depends on the number of repetition K. A frequency of the starting opportunity affects the latency with which the encoded data unit 442 and therefore the transport block 440 is transmitted. For a small number of repetitions, the frequency of the starting opportunity is increased, thereby providing lower latency but the reduced number of repetitions will reduce the communication reliability. In the case of a large number of repetitions, communication reliability is increased but the frequency of the starting opportunity for transmitting the encoded data unit is reduced thereby increasing the latency of transmission.

As described above, a URLLC PUSCH that starts in the middle of a transmission period may not have sufficient transmission occasions to complete the targeted K repetitions of a transmission period. One proposal is to have multiple grant free configurations where in each of this GF resource the transmission period starts at a different time [4], i.e. staggered in time. For example in FIG. 10 two configurations 620, 622 of grant free resources is shown where Configuration 1 620 starts its transmission period at the beginning of Slot n-1 624 whilst Configuration 2 622 starts at the OFDM symbol #4 626 which is therefore staggered in time. Hence if a URLLC PUSCH with K=4 arrives in the middle of a transmission period of Configuration 1, e.g. at OFDM symbol #4 626, then instead of using Configuration 1 620 thereby giving only two repetitions, it can use Configuration 2 622 which can provide four TOs 600 for four repetitions. As a result of there being different configurations, there is a possibility in which different services from the same UE wish to transmit in the same grant free resources at the same time. Our co-pending European patent application EP18197372.8 discloses an arrangement for transmitting transport blocks from different communications services with different configurations in which one service is prioritised over another service. The contents of EP18197372.8 are incorporated herein by reference.

Transmission Over a Mini-Slot Boundary

Figure 10:
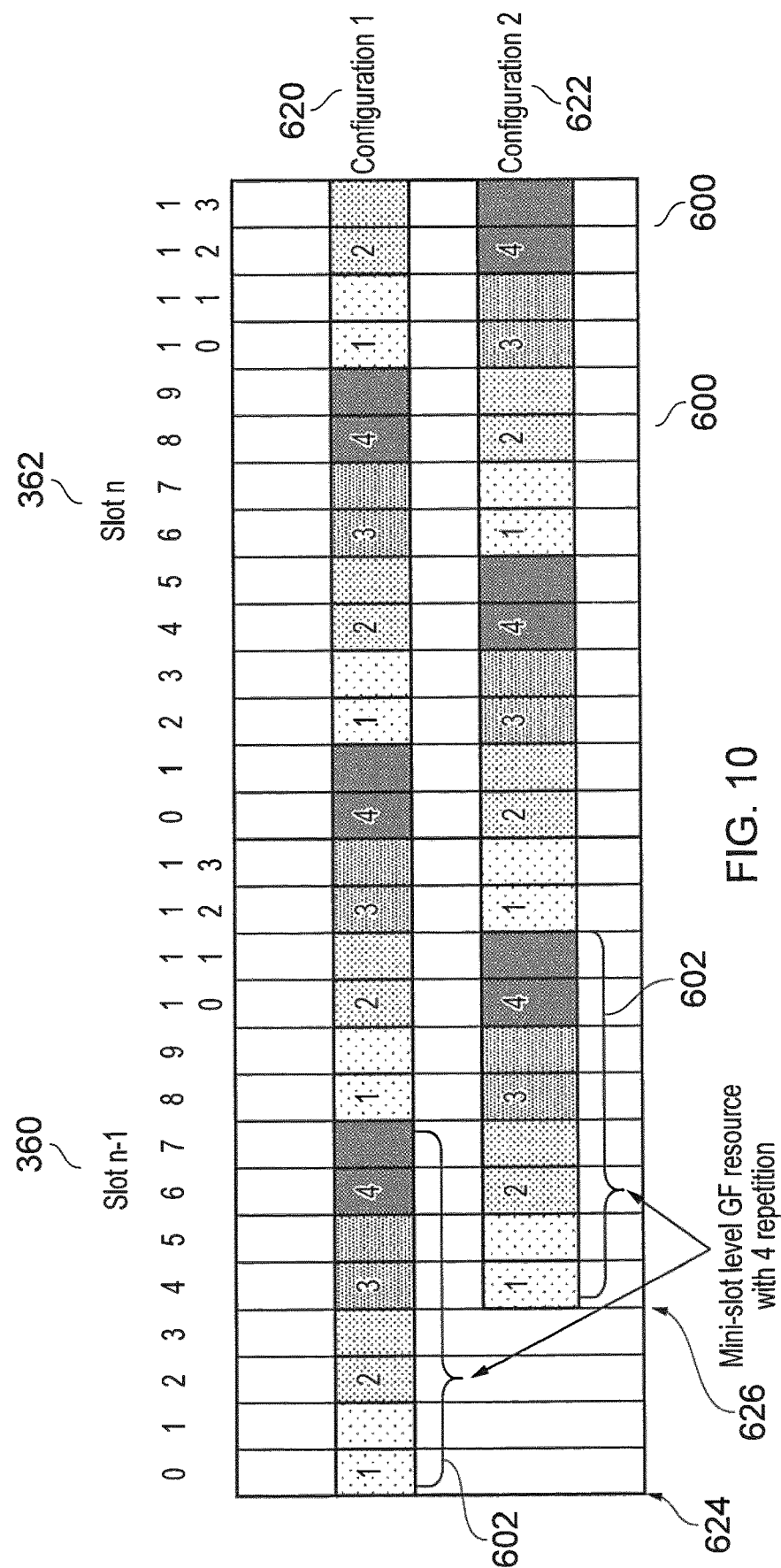
FIG. 10 is an illustration of the grant free uplink of a wireless access interface in which the grant free resources are used to transmit encoded data units in transmission occasions repeatedly to form a transmission period and showing two example configurations staggered in time to reduce a latency of transmitting uplink data.
Figure 11:
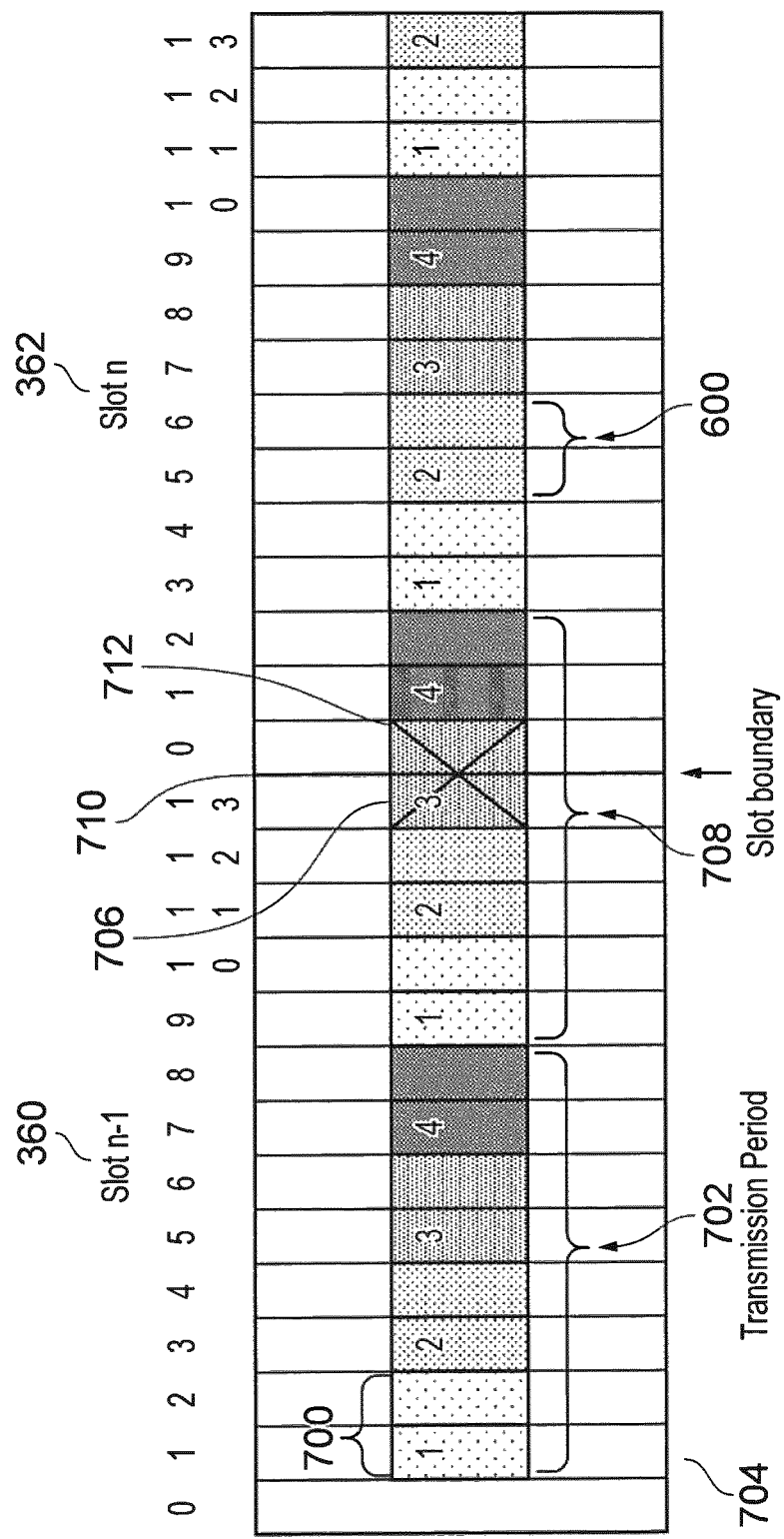
FIG. 11 is example illustration of a selection of uplink resources of a wireless access interface in which the resources are used to transmit encoded data units in transmission occasions repeatedly to form a transmission period and in which the transmission of the encoded data unit transitions a slot boundary.

For the example configurations shown in FIG. 10, each of the encoded data units is transmitted in the transmission occasions in two OFDM symbols. Furthermore the transmission is arranged to start on even OFDM symbols. However, having regard to a requirement to transmit a URLLC transport block for example as soon as possible, the starting symbol should be configured on unit of an OFDM symbol basis. That is to say that a UE should have a possibility of transmitting a transport block in a transmission period 602 which starts on an odd OFDM symbol. Such as arrangement is shown in FIG. 11, in which a transport block is transmitted in a transmission period 702 in which a first of the transmission occasions 700 in which a first of the K=4 encoded data units is transmitted begins 704 at the OFDM symbol 1. However whilst the first transport block may be transmitted in the transmission period 702 within the first slot 360, the next transmission period for the next transport block extends into the next slot 362. As a result of the transmission of the first transport block beginning on an odd OFDM symbol 704, a third repetition of the encoded data units 706 of the second transport block in the second transmission period 708 spans a boundary 710 between the first slot 360 and the second slot 362 as a result of the two OFDM symbols of the transmission occasion 706 on which the third encoded data unit 706 being either side of the slot boundary 710.

As represented in FIG. 11, a PUSCH transmission occasion is not permitted or cannot cross a slot boundary of an uplink granted resource. This is because other communications parameters such as a scrambling sequence the configured on a per slot basis. As a result the transmission of an encoded data unit across a slot boundary may not be decodable because other higher layer communications functions have been aligned on a slot-by-slot basis. As shown in FIG. 11, by a cross 712, a PUSCH transmission instance cannot be transmitted on symbol 13 of slot n-1 360 and symbol 0 of slot n 362.

Example embodiments of the present technique can therefore provide a method of operating a communications device to transmit data to a wireless communications network. The method may comprise processing uplink data for transmission of a physical uplink shared channel of a wireless access interface provided by the wireless communications network to form one or more transport blocks of the uplink data for transmission. The uplink resources provide communications resources in each of a plurality of time divided units of the wireless access interface for transmitting the uplink data. The method further includes preparing to transmit uplink data as one or more transport blocks using a selected set of the communications resources for transmitting the uplink data. The selected set of the communications resources may be as far as possible arranged to be contiguous, in that the resources are arranged for transmitting the transport blocks of the uplink data as quickly as possible. As indicated above, in one example the UE selects the set of the communications resources, but in another example the set of communications resources are selected by the wireless communications network (gNB). The method further includes detecting that the set of communications resources selected for transmitting the uplink data will cause one of the transport blocks to be transmitted across a boundary between two of the time divided units, and transmitting the uplink data in the selected set of the communications resources, the transmitting including delaying the transmission of the detected transport block which would have crossed the boundary to a later of the two time divided units. Therefore as shown for example in FIG. 11 as represented by the cross 712, the UE (controller circuitry) is configured to detect that a transmission of an encoded data unit of a transport block will cross the slot boundary 710 and configures the transmitter to delay transmitting the encoded data unit 706 until the start of the next slot 362.

As mentioned above the selected set of communications resources are contiguous in the sense that the communications resources of the wireless access interface which are selected provide for transmitting the transport block on the uplink as soon as possible. Typically, this will be successive resources in time, but not exclusively. For example, if the wireless access interface provides a plurality of OFDM symbols in each time divided unit then the selected set of communications resource maybe selected as successive OFDM symbols, which can result in the transmission of a transport block on the successive OFDM symbols crossing a slot boundary. However, the communications resources may be logically contiguous but may not be physically contiguous, so that some of the communications resources may be separated by other resources. For example if there are 14 OFDM symbols in a slot, in a TDD arrangement, some of the OFDM symbols may be used for downlink transmission. As a result, the repetition of an encoded data unit forming the transmission of the transport block may not be contiguous physically since there may be some downlink OFDM symbols transmission within the repetitions. Consider an example, where there are 4 PUSCH repetitions (encoded data units) forming a transport block and between PUSCH #2 and PUSCH #3 there is a gap comprising one or more OFDM symbols which are used for downlink transmission, which cannot be used for transmitting the uplink data. In this example the set of communications resource for transmitting the uplink data are not suitable for PUSCH (uplink) transmission. The selected set of communications resources are therefore not contiguous physically but logically contiguous in time in respect of the communications resources available for uplink transmission.

Example embodiments can also include identifying that as a result of the delaying the transmission of the detected transport block which would have crossed the boundary to the later of the two time divided units one or more of the set of communications resources selected for transmitting the uplink data in a first of the two time divided units will be unused. The one or more of the set of the communications resources which will be unused are referred to in this description as orphan resources. However the term "orphan" should not be used to imply that there is only one of the set of communications resources which are unused. The method can also include allocating the identified unused communications resources for transmitting other signals, and transmitting the other signals on the identified unused communications resources of the set of communications resources selected for transmitting the uplink data on the grant free resources.

Figure 12:
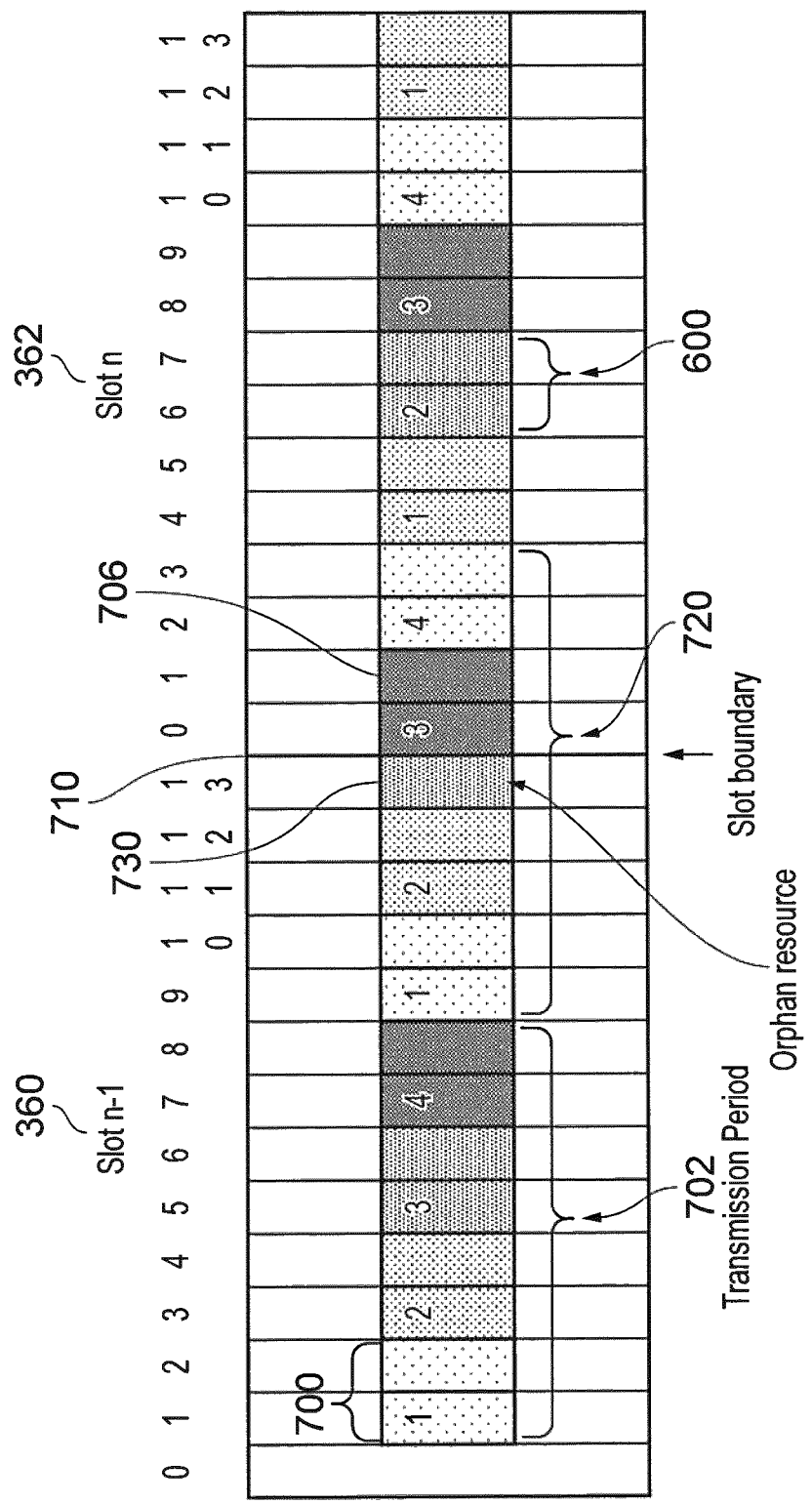
FIG. 12 is an illustration of an adaptation of the selected resources of the wireless access interface of FIG. 11, in which the transmission of the encoded data unit which would have crossed the slot boundary is delayed to the next slot to avoid the slot boundary thereby creating an unused (orphaned) communications resource.

According to example embodiments therefore, to avoid a PUSCH transmission across a slot boundary 710, the PUSCH can be shifted to available symbols in the next slot, as shown in FIG. 12. As a result of the shift, an orphan resource 730 occurs at symbol 13 in slot n-1 360, during the transmission period 720. From the viewpoint of spectrum efficiency, such an orphan resource 730 should be utilized effectively. In addition, in the case of the unlicensed band like 5 GHz, if a UE does not transmit anything on a symbol including the orphan symbol, another radio access technology (RAT) such as WiFi may detect that nothing has been transmitted in the orphan symbol 730 and consider that this resource is free to be used. As a result this other RAT may subsequently transmit in the corresponding resource in the next slot, sub-frame or frame and interfere with the UEs transmission.

According to example embodiments, after a UE recognizes a resource as an orphan, the UE utilizes the resource to transmit something useful. In addition, a frequency resource of the orphan resource can be a whole or a part of an OFDM symbol including the orphan resource. The following paragraphs provide examples of how the orphan resource can be used:

Uplink Signaling

The other signals transmitted in the detected unused communications resources (orphan resources) can be used to transmit uplink reference signalings for use by a receiver to detect the uplink data such as:

Additional DMRS

The orphan resource can be utilized for transmitting additional demodulation reference signals DMRS for a previous PUSCH(s) to assist the gNB in detecting the uplink data (e.g. a second transmission instance) or a next PUSCH(s) (e.g. a third transmission instance).

Figure 13:
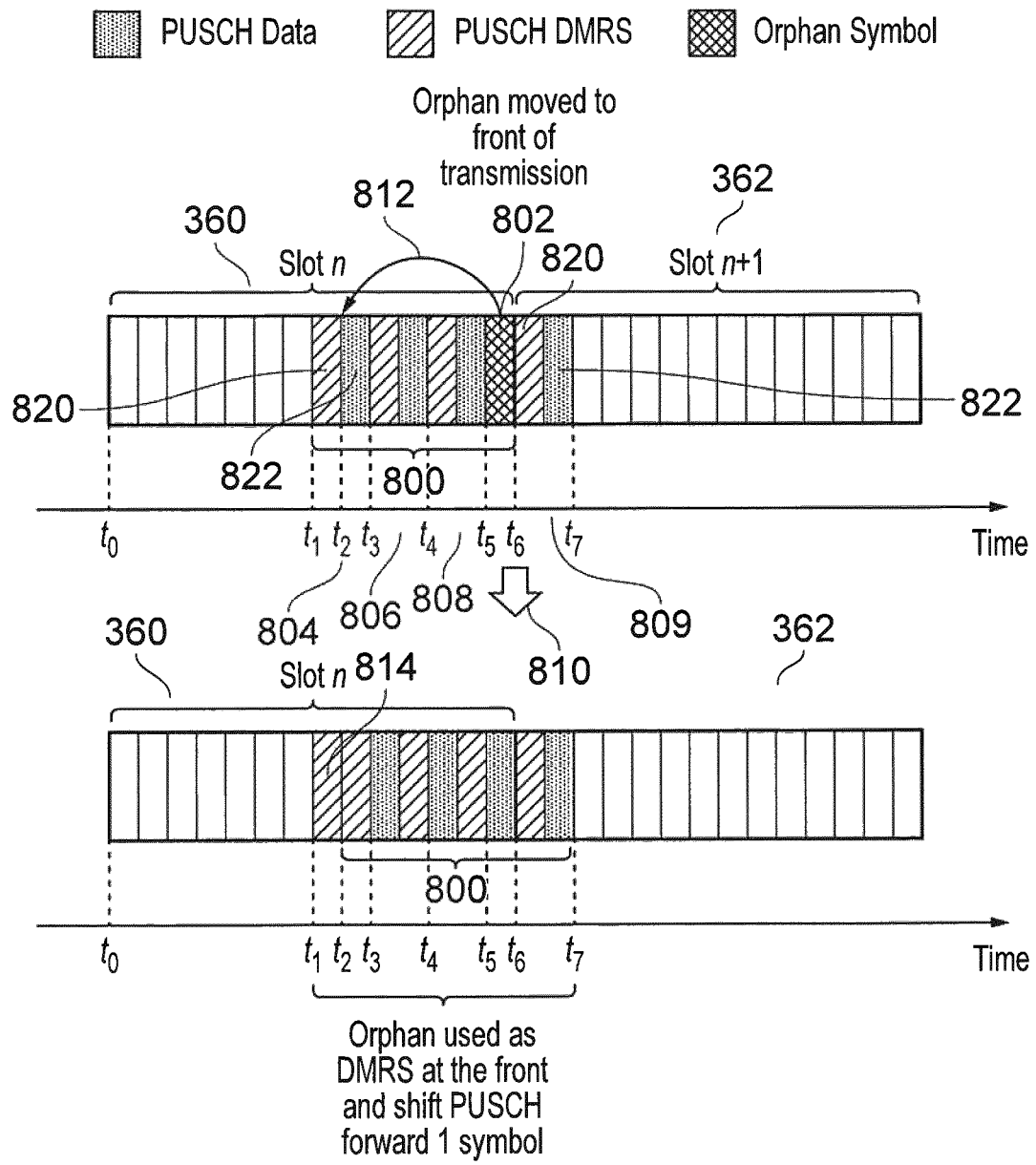
FIG. 13 are an illustration of another example embodiment in which an adaptation of the selected resource has an effect of shifting an unused (orphaned) resource to the start of the transmission of the uplink data and in which the unused resource is then used to transmit a demodulation reference symbol.

The location of the orphan symbol can be shifted to the beginning of the PUSCH transmission. That is the DRMS carried by the orphan symbol can be shifted to the beginning of the PUSCH transmission as shown in FIG. 13. In FIG. 13 the two slots of FIG. 12 are shown 360, 362 for which a timing of a transmission period 800 transmitting a transport block causes an orphan resource symbol at time t5 and t6. As shown in this example each of the pairs of symbols or mini-slots 804, 806, 808, 809 is used to transmit PUSCH data 820 on one symbols and a PUSCH DMRS 822. According to this example embodiment as represented by an arrow 810, the location of the orphan resource 800 is then shifted to the front of the PUSCH transmission at time t1 as represented by an arrow 812. The transmission period 800 in the original PUSCH is then shifted one symbol ahead to start at t2 instead of time t1. The orphan resource 802 is then used as a DMRS 814 transmitted between t1 and t2. This example recognizes that the DRMS at the front of the transmission can be more beneficial to facilitate early channel estimation.

Sounding reference signal

The orphan resource can be utilized for SRS (Sounding reference signal) transmissions in order to measure an uplink channel characteristics.

Uplink Control Information

The other signals transmitted in the unused communications resources (orphan resources) can be used to transmit uplink control information such as:

PUCCH

The orphan resource can be utilized to transmit a PUCCH containing uplink control information (UCI). The UCI includes channel state information (CSI), scheduling request (SR) for uplink communications resources to be granted to the UE and/or an automatic repeat request message such as for example a hybrid ARQ acknowledgement (HARQ-ACK) as part of an ARQ protocol.

For example, when a UE is configured with PUCCH transmission on slot n-1 but not the orphan resource, the UE transmits the PUCCH on the orphan resource. i.e. PUCCH resource is changed.

Another PUSCH

The orphan resource can be utilized by another PUSCH transmission. For example, the another PUSCH can contain a higher layer information such as buffer status report (BSR) indicating an amount of data for transmission in a UE's transmission buffer, a power head room (PHR) representing an indication of how much a UE can increase its transmission power with respect to a maximum power which the UE is permitted to transmit and/or a radio resource management (RRM) measurement result.

Pre-emption indicator

The orphan resource can be utilized to transmit an uplink PI (Pre-emption indicator), indicating that the transmission of the uplink data for one service is preempting the transmission of data from another communications service. For example data for transmission for a URLLC communications service may pre-empt (have priority over) the transmission over data for another communications service such as eMBB.

For example, the uplink PI can be used when a UE (self) pre-empts an uplink eMBB transmission, which have been scheduled by uplink grant from gNB.

PRACH

The orphan resource can be utilized for transmitting a physical random access channel (PRACH) preamble.

For example, the PRACH preamble and previous/next PUSCH can be applicable for enhancement of RACH procedure, for example according to a 2-step RACH process. A channel structure of the PRACH preamble and previous/next PUSCH may be called as msgA (message A). A PUSCH in msgA can include the equivalent contents of msg3 of current 4-step RACH in Rel-15.

Transmitting Data

Copy of OFDM symbol

The orphan resource can be utilized by a whole or a part of symbols of previous PUSCH or next PUSCH. For example, a first symbol of the second transmission instance (transport block or encoded data unit) (i.e. symbol 11 on slot n-1) is copied to the orphan resource.

Effectively this is a partial repetition of a PUSCH.

Longer transmission instance

The orphan resource can be utilized as a part of previous PUSCH or next PUSCH, that is to say, to transmit uplink data for the same communications service or a different communications.

For example, the orphan resource is a third symbol of a PUSCH transmission of a transport block for uplink data, which is usually required to be transmitted on two OFMD symbols, whereas according to this example the orphan resource allows this transport block to be transmitted using three OFDM symbols such as symbol 11 to 13 in slot n-1 360.

According to this longer PUSCH transmission a lower coding rate can be used. For example if a transport block can be transmitted on three OFDM symbols then a lower coding rate can be used because there is more communications resource available.

DTX

The orphan symbol is DTX, i.e. nothing transmitted.

Converted to Downlink Symbol

In a TDD system a symbol in a slot can be used for uplink or downlink transmission. Hence the orphan symbol can be converted to a downlink symbol. That is to say that the orphan symbol which was originally an uplink symbol is converted for use on the downlink.

This converted downlink symbol can be used by the gNB to indicate early termination of PUSCH repetitions. That is at the orphan symbol, the UE switched to receiving or monitoring of control channel such as PDCCH to detect a DCI indicating whether the UE can stop its PUSCH transmission as the gNB has already received them. In other words, the orphan symbol is used to indicate an early ACK from the gNB.

Figure 14:
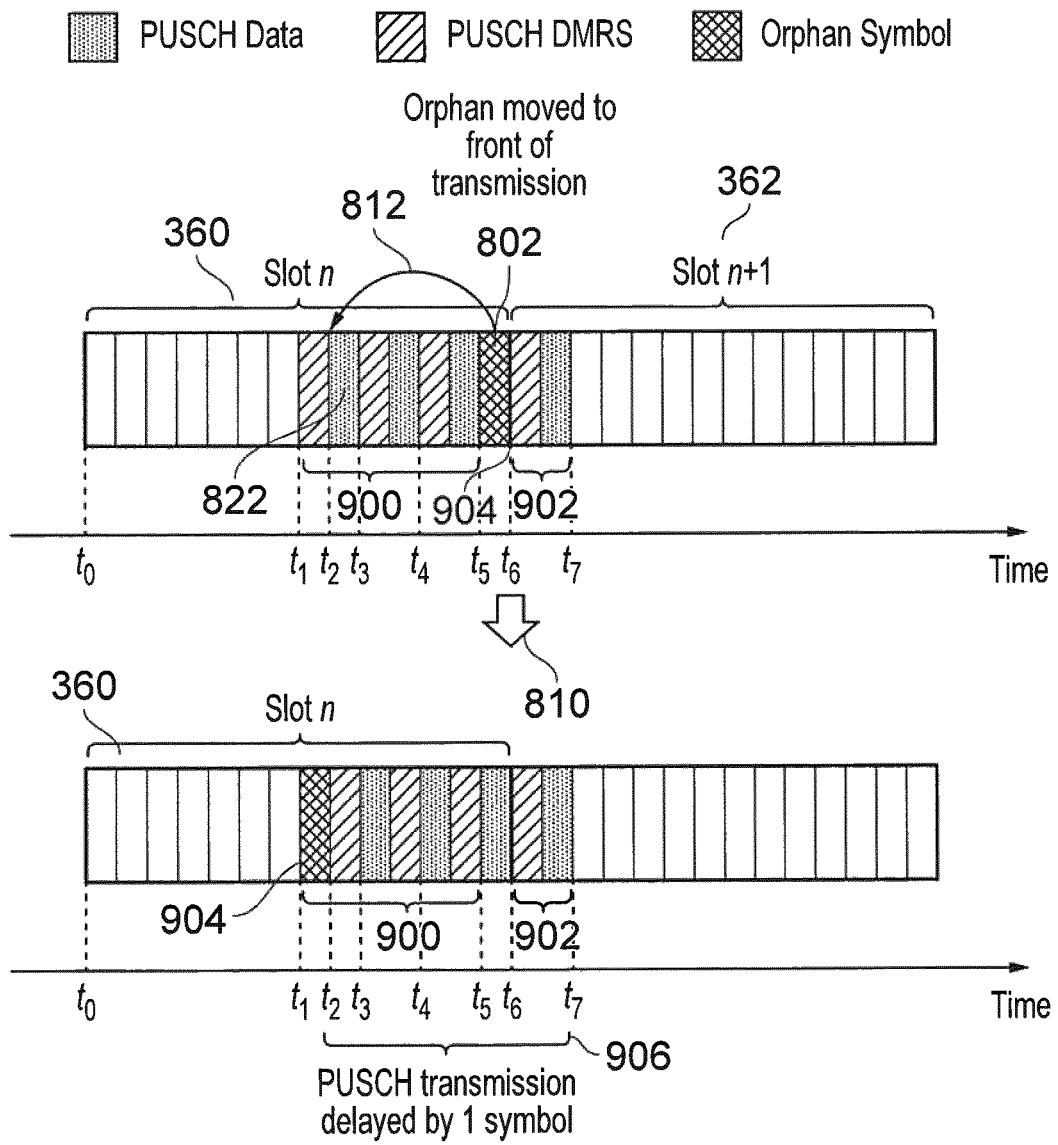
FIG. 14 is an illustration of another example embodiment in which an adaptation of the selected resource has an effect of shifting an unused (orphaned) resource to the start of the transmission of the uplink data although in comparison to FIG. 13, the unused resource is left unused.

According to another example, which may be thought of as an adaptation of the example embodiment shown in FIG. 13, the orphaned resource is shifted to the beginning of the uplink transmission of the detected transport block. This example is illustrated in FIG. 14 which is corresponds to FIG. 13 and so only the differences will be described. As with the example in FIG. 13 the communications resources of the wireless access interface are configured for Orthogonal Frequency Division Multiplexed, OFDM, symbols. In FIG. 14, the detected transport block carrying the uplink data may be thought of comprising a a first part before the boundary between the two slots 360, 362 and a second part 902 which is shifted to after the slot boundary. As explained above, the first part may comprise one or more repeatedly transmitted encoded data units and the second part may comprise one or more encoded data units of the transport block. The transmission of the detected transport block is adapted to delay the transmission of the a second part 902 which would have crossed the boundary to a later of the two time divided units to avoid the boundary between the time divided units 904. The unused OFDM symbol 802 as a result of delaying the second part 902 is then identified. In this embodiment as represented in FIG. 14b, the first part of the OFDM symbol is then delayed by obe symbol 906 and the orphaned resource shifted to the start of the uplink transmission 904. Here the orphan symbol is moved to the front of the PUSCH repetition which has the effect of delaying the PUSCH transmission by one symbol. Originally the PUSCH repetition starts at time t1 which resulted in an orphan symbol. So the orphan symbol is then moved to the front which effectively shifts the PUSCH transmission by one symbol, that is, as a result of this, the PUSCH starts at time t2 instead. As such in FIG. 14, whether PUSCH starts at t1 or t2, the PUSCH repetition still ends at time t7. It should be appreciated that although the orphan symbol in FIG. 14 is shifted to the front, it can also be shifted to other positions (e.g. between t1 to t5)

As will be appreciated, the example of FIG. 14 only differs from the example of FIG. 13 in that the orphaned resource which is shifted to the beginning as shown in FIG. 13 is used to transmit an additional reference symbol (DMRS).

How to Detect the Orphan Resource

As indicated above according to example embodiments a UE can be configured to detect the unused communications resources (orphan resources) resulting from delaying the transmission of a transport block which would have been transmitted across a slot boundary. The UE can detect the orphan resource implicitly and/or explicitly as will be explained in the following paragraphs.

In one example, a gNB can indicate the orphan resource to the UE implicitly and/or explicitly. In one example embodiment, a gNB can explicitly indicate the orphan resource by transmitting for reception by the UE an indication of the one or more unused communications resources. The indication can be transmitted using one of a radio resource control (RRC) message, a medium access control (MAC) message or as downlink control information (DCI).

In other example embodiments, in addition to the presence of orphaned resource, the gNB can also indicate whether the orphaned resource can be used or not. That is to say that the gNB or more generally the wireless communications network signals an indication as to whether or not the unused (orphaned) communications resources should be used for transmitting the other signals, and if the unused communications resources can be used the UE allocated the unused resources for transmitting the other signals as per the above examples. If not then the UE does not transmit in the unused resources. This example may be used if a UE is configured with grant free or grant based resources and can then be further configured with the orphan resource usage as sub-option. If a network operator wants to use the orphan resource for another UE, then the orphan resource usage will be disabled.

In other example embodiments, the wireless communications network (gNB) transmits an indication of the control information or data which should be transmitted as the other signals in the unused communications resources, i.e. how the orphan resources are to be utilised, e.g. whether used as DMRS, SRS, or just DTX as explained above.

In another embodiment, the UE can implicitly recognise a resource as the orphan resource when the number of symbols remaining after the last transport block or encoded data unit of a PUSCH repetition within a slot is smaller than the number of symbols of one PUSCH transmission occasion. For the example illustrated in FIG. 12, the number of symbols of the resource is one and the number of symbols of one PUSCH transmission instance is two. Therefore the UE can recognise the resource as the orphan resource, which are the remaining symbols available for uplink PUSCH transmission.

In another embodiment, the available OFDM symbols in a slot may depend on a configuration of the slot where the wireless access interface is configured to support time division duplex. The method can therefore include receiving a format indication for the time divided unit providing an indication of which of the OFDM symbols of the time divided unit have been allocated for uplink communication and which of the OFDM symbols have been allocated for downlink communications. According to this example symbols of the PUSCH, which are available for transmitting the encoded transport blocks a slot format is indicated from gNB in a TDD system. The slot format includes downlink symbols, uplink symbols, and flexible symbols. The indication is performed using higher layer signaling, DCI signaling via group common PDCCH and/or DCI signaling via UE-specific PDCCH.

According to this example therefore the determining implicitly the unused communications resources of the time divided unit (slot) includes identifying a number of the OFDM symbols which have been allocated for uplink communications from the received format indication and determining a number of the allocated uplink OFDM symbols in the time divided unit which remain of the allocated uplink OFDM symbols after the last of the encoded data units of the encoded transport block has been transmitted and the number of OFDM symbols required to transmit the next of the encoded data units of the encoded transport block or the encoded data unit of the next encoded transport block. As will be appreciated therefore, there may be sufficient symbols at the end of the slot for a full PUSCH transmission but some of these symbols may be used for downlink and hence not available for uplink PUSCH transmission. For example, if a symbol is indicated as an uplink symbol, the symbol is assumed as valid PUSCH symbol. If a symbol is indicated as a downlink symbol, the symbol is assumed as invalid PUSCH symbol. If a symbol is indicated as a flexible symbol, the symbol is assumed based on other signalling or procedure (e.g. whether the scheduling is UL grant or configured grant).

In another embodiment, the UE can implicitly recognise a frequency bandwidth of the orphan resource based on a bandwidth of the configured grant PUSCH.

In another embodiment, the orphan resource (i.e. the resource utilised by above explanations) can be shifted to another symbol. The shift can be restricted within the same slot. For example in FIG. 12, the orphan resource recognised on symbol 13 of slot n-1 360 can be shifted to a symbol prior to a previous PUSCH (i.e. symbol 11 of slot n-1 360) or a symbol prior to a previous transmission period (i.e. symbol 9 of slot n-1 360).

Summary of Operation

Figure 15:
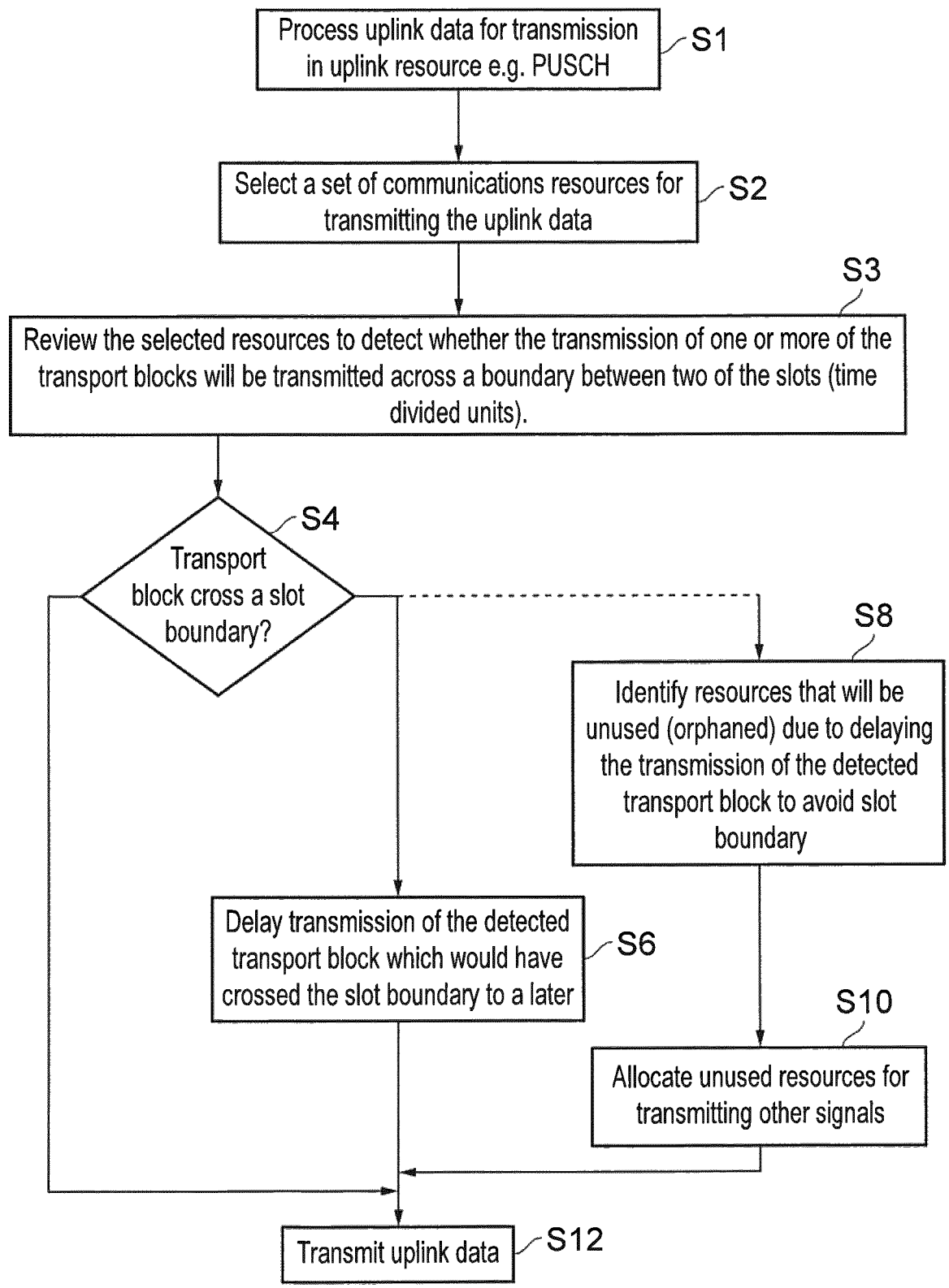
FIG. 15 is a flow diagram illustrating an example operation of a communications device (UE) according to an example embodiment of the present technique.

FIG. 15 provides a flow diagram, which summarises the operation of the UE according to some example embodiments. The flow diagram representing the operation of the UE is as follows:

S1: The UE processes uplink data for transmission on resources of a physical uplink shared channel of a wireless access interface provided by a wireless communications network. The uplink data may have been generated for example by a URLLC source which is a communications service being supported by the UE. For transmission of the uplink data a transmitter circuitry/controller circuitry of the UE forms one or more transport blocks from the uplink data for transmission. As explained above the uplink resources are provided within the uplink shared channel to include communications resources in each of a plurality of time divided units of the wireless access interface for transmitting the uplink data. The uplink resources may be grant free or may have been granted following a request from the UE. As explained in the example embodiments the time divided units may be slots of the wireless access interface each of which may be formed from a number of OFDM symbols (fourteen in the above examples in FIGS. 11 and 12).

S2: The UE selects from the uplink communications resources, a set of the communications resources for transmitting the uplink data. The set of the communications resources may be selected so that the communications resources are contiguous, so that the uplink data can be transmitted as quickly as possible.

S3: The UE then reviews the selected resources or as part of step S2 detects whether the set of communications resources selected for transmitting the uplink data will cause one or more of the transport blocks to be transmitted across a boundary between two of the slots (time divided units).

S4: At the decision point S4, if the UE has detected that the selected resources with cause the transmission of a transport block to cross a slot boundary then processing proceeds to step S6, otherwise processing proceeds to step S12 and the uplink data is transmitted as normal.

S6: The UE then transmits the uplink data in the selected set of the communications resources, the transmitting including delaying the transmission of the detected transport block which would have crossed the boundary to a later of the two time divided units.

S8: Optionally as part of the transmitting the uplink data or as part of the review of the selected uplink resources, the UE may identify one or more of the set of communications resources that will be unused and therefore orphaned as a result of the delaying the transmission of the detected transport block which would have crossed the slot boundary to the later of the two slots.

S10: The identified unused communications resources are then allocated for transmitting other signals, such as control information for signalling or improve the communication of the uplink data such as reference signals or for other purposes such as downlink communications.

S12: With the transmission of the uplink data, the UE includes the transmission of the other signals on the identified unused or orphaned communications resources of the set of communications resources selected for transmitting the uplink data on the grant free resources.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating a communications device to transmit data to a wireless communications network, the method comprising preparing to transmit uplink data as one or more transport blocks using a selected set of communications resources, the selected set of the communications resources being arranged to be contiguous and providing communications resources in each of a plurality of time divided units of a wireless access interface for transmitting the uplink data, detecting that the selected set of communications resources for transmitting the uplink data will cause one of the transport blocks to be transmitted across a boundary between two of the time divided units, and transmitting the uplink data in the selected set of the communications resources, the transmitting including adapting the transmission of the detected transport block to avoid transmitting across the boundary between the two time divided units.

Paragraph 2. A method of paragraph 1, wherein the adapting the transmission of the detected transport block comprises delaying the transmission of the detected transport block which would have crossed the boundary to a later of the two time divided units to avoid the boundary between the time divided units, identifying one or more of the selected set of communications resources that will be unused as a result of the delaying the transmission of the detected transport block which would have crossed the slot boundary to the later of the two time divided units, allocating the identified unused communications resources for transmitting other signals, and transmitting the other signals on the identified unused communications resources of the set of communications resources selected for transmitting the uplink data on the uplink resources.

Paragraph 3. A method of paragraph 2, wherein the other signals are used to transmit uplink control information usually transmitted in an uplink control channel.

Paragraph 4. A method of paragraph 3, wherein the uplink control information includes one or more of channel state information, a scheduling request for uplink communications resources or an automatic repeat request message.

Paragraph 5. A method of paragraph 2, wherein the other signals are used to transmit uplink control information usually transmitted in an uplink shared channel.

Paragraph 6. A method of paragraph 5, wherein the uplink control information includes one or more of a buffer status report, a power headroom or a radio resource management (RRM) measurement result.

Paragraph 7. A method of paragraph 3, wherein the other signals are used to transmit uplink control information comprising one of a pre-emption indicator or a physical random access channel preamble.

Paragraph 8. A method of paragraph 2, wherein the other signals are used to receive downlink data, the other signals having been transmitted from the wireless communications network, the wireless access interface being configured to support time division duplex.

Paragraph 9. A method of paragraph 1 wherein the communications resources of the wireless access interface are configured for Orthogonal Frequency Division Multiplexed, OFDM, symbols, and the adapting the transmission of the detected transport block comprises
  delaying the transmission of the detected transport block which would have crossed the boundary to a later of the two time divided units to avoid the boundary between the time divided units,
  identifying one or more OFDM symbols that will be unused as a result of the delaying the transmission of the detected transport block which would have crossed the slot boundary to the later of the two time divided units, and
  adapting the transmission of the uplink data to use the one or more unused OFDM symbols of the identified unused communications resources to transmit the uplink data.

Paragraph 10. A method of paragraph 9, wherein the adapting the transmission of the uplink data includes repeatedly transmitting one or more OFDM symbols of the detected transport block or another transport block in the resources provided by the one or more unused OFDM symbols.

Paragraph 11. A method of paragraph 9, wherein the transmitting the uplink data includes transmitting part or all of the detected transport block or part or all of another transport block on OFDM symbols including the OFDM symbols of the unused communications resources.

Paragraph 12. A method of any of paragraphs 2 to 11, comprising
  receiving from the wireless communications network an indication of the control information or data which should be transmitted as the other signals in the unused communications resources.

Paragraph 13. A method of paragraph 2, comprising
  receiving from the wireless communications network an indication as to whether or not the unused communications resources should be used for transmitting the other signals, and if the unused communications resources can be used,
  allocating the identified unused communications resources for transmitting the other signals, and
  transmitting the other signals on the identified unused communications resources of the set of communications resources selected for transmitting the uplink data, or else
  not transmitting the other signals in the unused communications resources.

Paragraph 14. A method of any of paragraphs 2 to 12, wherein the identifying the one or more unused communications resources as a result of the delaying the transmission of the detected transport block, comprises receiving an indication of the one or more unused communications resources from the wireless communications network.

Paragraph 15. A method of paragraph 13, wherein the indication is received from the wireless communications network using one of a radio resource management message, a medium access control message or as downlink control information.

Paragraph 16. A method of any of paragraphs 2 to 11, wherein the processing the uplink data for transmission includes
  forming the uplink data into the uplink transport blocks for transmission in one of a plurality of transmission periods,
  encoding each of the uplink transport blocks to encoded transport blocks,
  forming from each of the encoded transport blocks a plurality of encoded data units, each of the encoded data units being formed for repeated transmission in each of a plurality of transmission occasions forming each of the transmission periods in communications resources of the uplink resources.

Paragraph 17. A method of paragraph 16, wherein the communications resources of the wireless access interface are configured for Orthogonal Frequency Division Multiplexed, OFDM, symbols, the unused communications resources comprising one or more OFDM symbols, wherein the identifying the one or more unused communications resources as a result of the delaying the transmission of the detected transport block, comprises determining, by the communications device, implicitly from a number of the OFDM symbols in the time divided unit which remain after a last of the encoded data units of an encoded transport block has been transmitted and a number of OFDM symbols required to transmit a next of the encoded data units of the encoded transport block or an encoded data unit of a next encoded transport block.

Paragraph 18. A method of paragraph 17, wherein the wireless access interface is configured to support time division duplex and the method includes receiving a format indication providing an indication of which of the OFDM symbols of the time divided unit have been allocated for uplink communication and which of the OFDM symbols have been allocated for downlink communications and the determining implicitly the unused communications resources of the time divided unit includes identifying a number of the OFDM symbols which have been allocated for uplink communications from the received format indication and determining a number of the allocated uplink OFDM symbols in the time divided unit which remain of the allocated uplink OFDM symbols after the last of the encoded data units of the encoded transport block has been transmitted and the number of OFDM symbols required to transmit the next of the encoded data units of the encoded transport block or the encoded data unit of the next encoded transport block.

Paragraph 19. A method of any of paragraphs 2 to 18, wherein a frequency band width of the unused communications resource is determined based on a bandwidth of the configured uplink resources.

Paragraph 20. A method of paragraph 1, wherein the communications resources of the wireless access interface are configured for Orthogonal Frequency Division Multiplexed, OFDM, symbols, and the adapting the transmission of the detected transport block comprises
  delaying the transmission of the a second part of the detected transport block which would have crossed the boundary to a later of the two time divided units to avoid the boundary between the time divided units,
  identifying one or more OFDM symbols that will be unused as a result of the delaying the transmission of the detected transport block which would have crossed the slot boundary to the later of the two time divided units, and
  delaying the transmission of one or more OFDM symbols of a first part of the uplink data to use the one or more unused OFDM symbols of the identified unused communications resources to transmit the uplink data.

Paragraph 21. A method of paragraph 20, wherein the delaying the transmission of one or more OFDM symbols of a first part of the uplink data to use the one or more unused OFDM symbols shifts the one or more identified unused OFDM symbols of the first part to be before the transmission of the delayed OFDM symbols of the first part.

Paragraph 22. A method of paragraph 21, wherein the uplink data includes data bearing OFDM symbols and reference symbols, and the transmitting the uplink data in the selected set of communications resources comprises
  transmitting a reference symbol in the shifted one or more identified unused OFDM symbols before transmitting the delayed OFDM symbols of the first part forming the detected transport block.

Paragraph 23. A method of any of paragraphs 1 to 22, wherein the selected set of the communications resources for transmitting the uplink data are logically contiguous.

Paragraph 24. A communications device for communicating data a wireless communications network, the communications device comprising
  transmitter circuitry configured to transmit signal via a wireless access interface provided by the wireless communications network, and
  controller circuitry configured with the transmitter circuitry
  to preparing uplink data for transmission as one or more transport blocks using a selected set of communications resources, the selected set of the communications resources being arranged to be contiguous and providing communications resources in each of a plurality of time divided units of the wireless access interface for transmitting the uplink data,
  to detect that the set of communications resources selected for transmitting the uplink data will cause one of the transport blocks to be transmitted across a boundary between two of the time divided units, and
  to transmit the uplink data in the selected set of the communications resources by adapting the transmission of the detected transport block to avoid transmitting across the boundary between the two time divided units.

Paragraph 25. A communications device of paragraph 24, wherein the controller circuitry configured with the transmitter circuitry to adapt the transmission of the detected transport block by
  delaying the transmission of the detected transport block which would have crossed the boundary to a later of the two time divided units to avoid the boundary between the time divided units,
  identifying one or more of the set of communications resources that will be unused as a result of the delaying the transmission of the detected transport block which would have crossed the slot boundary to the later of the two time divided units,
  allocating the identified unused communications resources for transmitting other signals, and
  transmitting the other signals on the identified unused communications resources of the set of communications resources selected for transmitting the uplink data on the uplink resources.

Paragraph 26. Circuitry for communicating data via a wireless communications network, the circuitry comprising
  transmitter circuitry configured to transmit signal via a wireless access interface provided by the wireless communications network, and
  controller circuitry configured with the transmitter circuitry
  to preparing uplink data for transmission as one or more transport blocks using a selected set of communications resources, the selected set of the communications resources being arranged to be contiguous and providing communications resources in each of a plurality of time divided units of the wireless access interface for transmitting the uplink data,
  to detect that the set of communications resources selected for transmitting the uplink data will cause one of the transport blocks to be transmitted across a boundary between two of the time divided units, and
  to transmit the uplink data in the selected set of the communications resources by adapting the transmission of the detected transport block to avoid transmitting across the boundary between the two time divided units.

Paragraph 27. Circuitry of paragraph 26, wherein the controller circuitry configured with the transmitter circuitry to adapt the transmission of the detected transport block by
  delaying the transmission of the detected transport block which would have crossed the boundary to a later of the two time divided units to avoid the boundary between the time divided units,
  identifying one or more of the set of communications resources that will be unused as a result of the delaying the transmission of the detected transport block which would have crossed the slot boundary to the later of the two time divided units,
  allocating the identified unused communications resources for transmitting other signals, and
  transmitting the other signals on the identified unused communications resources of the set of communications resources selected for transmitting the uplink data on the uplink resources.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-172834, "Work Item on New Radio (NR) Access Technology," NTT DOCOMO, RAN #78

[3] RP-181477, "New SID on Physical Layer Enhancements for NR URLLC," Huawei, HiSilicon, Nokia, Nokia Shanghai Bell, RAN #80.

[4] R1-1809979, Summary of 7.2.6.3 Enhanced UL grant-free transmissions, NTT DOCOMO, RAN1 #94.

Annex 1

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 16 and 17.

FIG. 16 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 16, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 14, also includes an illustration of each sub-frame 1201, which comprises a control region 1205 for the transmission of control data, a data region 1206 for the transmission of user data and reference signals 207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 14, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 17 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 300 is divided into 10 sub-frames 301 of 1 ms duration where each sub-frame 301 comprises two slots 302 of 0.5 ms duration. Each slot 302 is then formed from seven OFDM symbols 303 where a cyclic prefix 304 is inserted between each symbol in a manner equivalent to that in downlink sub-frames.

As shown in FIG. 17, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:
1. A method of operating a communications device to transmit data to a wireless communications network, the method comprising:
preparing to transmit uplink data as one or more transport blocks using a selected set of communications resources, the selected set of the communications resources being arranged to be contiguous and providing communications resources in each of a plurality of time divided units of a wireless access interface for transmitting the uplink data,
detecting that the selected set of communications resources for transmitting the uplink data will cause one of the transport blocks to be transmitted across a boundary between two of the time divided units, and
transmitting the uplink data in the selected set of the communications resources, the transmitting including adapting the transmission of the detected transport block to avoid transmitting across the boundary between the two time divided units, wherein the adapting the transmission of the detected transport block comprises
delaying the transmission of the detected transport block which would have crossed the boundary to a later of the two time divided units to avoid the boundary between the time divided units,
identifying one or more of the selected set of communications resources that will be unused as a result of the delaying the transmission of the detected transport block which would have crossed the slot boundary to the later of the two time divided units,
allocating the identified unused communications resources for transmitting other signals, and
transmitting the other signals on the identified unused communications resources of the set of communications resources selected for transmitting the uplink data on the uplink resources.

2. The method of claim 1, wherein
the other signals are used to transmit uplink control information usually transmitted in an uplink control channel.

3. The method of claim 2, wherein
the uplink control information includes one or more of channel state information, a scheduling request for uplink communications resources or an automatic repeat request message.

4. The method of claim 2, wherein
the other signals are used to transmit uplink control information comprising one of a pre-emption indicator or a physical random access channel preamble.

5. The method of claim 1, wherein
the other signals are used to transmit uplink control information usually transmitted in an uplink shared channel.

6. The method of claim 5, wherein
the uplink control information includes one or more of a buffer status report, a power headroom or a radio resource management (RRM) measurement result.

7. The method of claim 1, wherein
the other signals are used to receive downlink data, the other signals having been transmitted from the wireless communications network, the wireless access interface being configured to support time division duplex.

8. The method of claim 1, comprising:
receiving from the wireless communications network an indication of the control information or data which should be transmitted as the other signals in the unused communications resources.

9. The method of claim 1, comprising:
receiving from the wireless communications network an indication as to whether or not the unused communications resources should be used for transmitting the other signals, and if the unused communications resources can be used,
allocating the identified unused communications resources for transmitting the other signals, and
transmitting the other signals on the identified unused communications resources of the set of communications resources selected for transmitting the uplink data, or else
not transmitting the other signals in the unused communications resources.

10. The method of claim 9, wherein
the indication is received from the wireless communications network using one of a radio resource management message, a medium access control message or as downlink control information.

11. The method of claim 1, wherein
the identifying the one or more unused communications resources as a result of the delaying the transmission of the detected transport block, comprises receiving an indication of the one or more unused communications resources from the wireless communications network.

12. The method of claim 1, wherein the processing the uplink data for transmission includes
forming the uplink data into the uplink transport blocks for transmission in one of a plurality of transmission periods,
encoding each of the uplink transport blocks to encoded transport blocks,
forming from each of the encoded transport blocks a plurality of encoded data units, each of the encoded data units being formed for repeated transmission in each of a plurality of transmission occasions forming each of the transmission periods in communications resources of the uplink resources.

13. The method of claim 12, wherein
the communications resources of the wireless access interface are configured for Orthogonal Frequency Division Multiplexed (OFDM) symbols, the unused communications resources comprising one or more OFDM symbols, wherein the identifying the one or more unused communications resources as a result of the delaying the transmission of the detected transport block, comprises determining, by the communications device, implicitly from a number of the OFDM symbols in the time divided unit which remain after a last of the encoded data units of an encoded transport block has been transmitted and a number of OFDM symbols required to transmit a next of the encoded data units of the encoded transport block or an encoded data unit of a next encoded transport block.

14. The method of claim 13, wherein
the wireless access interface is configured to support time division duplex and the method includes receiving a format indication providing an indication of which of the OFDM symbols of the time divided unit have been allocated for uplink communication and which of the OFDM symbols have been allocated for downlink communications and the determining implicitly the unused communications resources of the time divided unit includes identifying a number of the OFDM symbols which have been allocated for uplink communications from the received format indication and determining a number of the allocated uplink OFDM symbols in the time divided unit which remain of the allocated uplink OFDM symbols after the last of the encoded data units of the encoded transport block has been transmitted and the number of OFDM symbols required to transmit the next of the encoded data units of the encoded transport block or the encoded data unit of the next encoded transport block.

15. The method of claim 1, wherein
a frequency band width of the unused communications resource is determined based on a bandwidth of the configured uplink resources.

16. A method of operating a communications device to transmit data to a wireless communications network, the method comprising:
preparing to transmit uplink data as one or more transport blocks using a selected set of communications resources, the selected set of the communications resources being arranged to be contiguous and providing communications resources in each of a plurality of time divided units of a wireless access interface for transmitting the uplink data, detecting that the selected set of communications resources for transmitting the uplink data will cause one of the transport blocks to be transmitted across a boundary between two of the time divided units, and transmitting the uplink data in the selected set of the communications resources, the transmitting including adapting the transmission of the detected transport block to avoid transmitting across the boundary between the two time divided units, wherein the communications resources of the wireless access interface are configured for Orthogonal Frequency Division Multiplexed (OFDM)symbols, and the adapting the transmission of the detected transport block comprises delaying the transmission of the detected transport block which would have crossed the boundary to a later of the two time divided units to avoid the boundary between the time divided units, identifying one or more OFDM symbols that will be unused as a result of the delaying the transmission of the detected transport block which would have crossed the slot boundary to the later of the two time divided units, and adapting the transmission of the uplink data to use the one or more unused OFDM symbols of the identified unused communications resources to transmit the uplink data.

17. The method of claim 16, wherein the adapting the transmission of the uplink data includes repeatedly transmitting one or more OFDM symbols of the detected transport block or another transport block in the resources provided by the one or more unused OFDM symbols.

18. The method of claim 16, wherein the transmitting the uplink data includes transmitting part or all of the detected transport block or part or all of another transport block on OFDM symbols including the OFDM symbols of the unused communications resources.

19. A method of operating a communications device to transmit data to a wireless communications network, the method comprising:

preparing to transmit uplink data as one or more transport blocks using a selected set of communications resources, the selected set of the communications resources being arranged to be contiguous and providing communications resources in each of a plurality of time divided units of a wireless access interface for transmitting the uplink data, detecting that the selected set of communications resources for transmitting the uplink data will cause one of the transport blocks to be transmitted across a boundary between two of the time divided units, and transmitting the uplink data in the selected set of the communications resources, the transmitting including adapting the transmission of the detected transport block to avoid transmitting across the boundary between the two time divided units, wherein the communications resources of the wireless access interface are configured for Orthogonal Frequency Division Multiplexed, OFDM, symbols, and the adapting the transmission of the detected transport block comprises delaying the transmission of a second part of the detected transport block which would have crossed the boundary to a later of the two time divided units to avoid the boundary between the time divided units, identifying one or more OFDM symbols that will be unused as a result of the delaying the transmission of the detected transport block which would have crossed the slot boundary to the later of the two time divided units, and delaying the transmission of one or more OFDM symbols of a first part of the uplink data to use the one or more unused OFDM symbols of the identified unused communications resources to transmit the uplink data.

* * * * *